March 18, 1930.  J. LAWSON  1,751,450
MACHINE FOR MAKING FASHIONED HOSIERY
Filed April 24, 1920  11 Sheets-Sheet 1

Inventor:
John Lawson
by Emery, Booth, Janney & Varney
Attys.

March 18, 1930.　　　　　J. LAWSON　　　　　1,751,450
MACHINE FOR MAKING FASHIONED HOSIERY
Filed April 24, 1920　　11 Sheets-Sheet 4

*Fig. 4.*

Inventor:
John Lawson,
by Emery, Booth, Janney & Varney
Attys

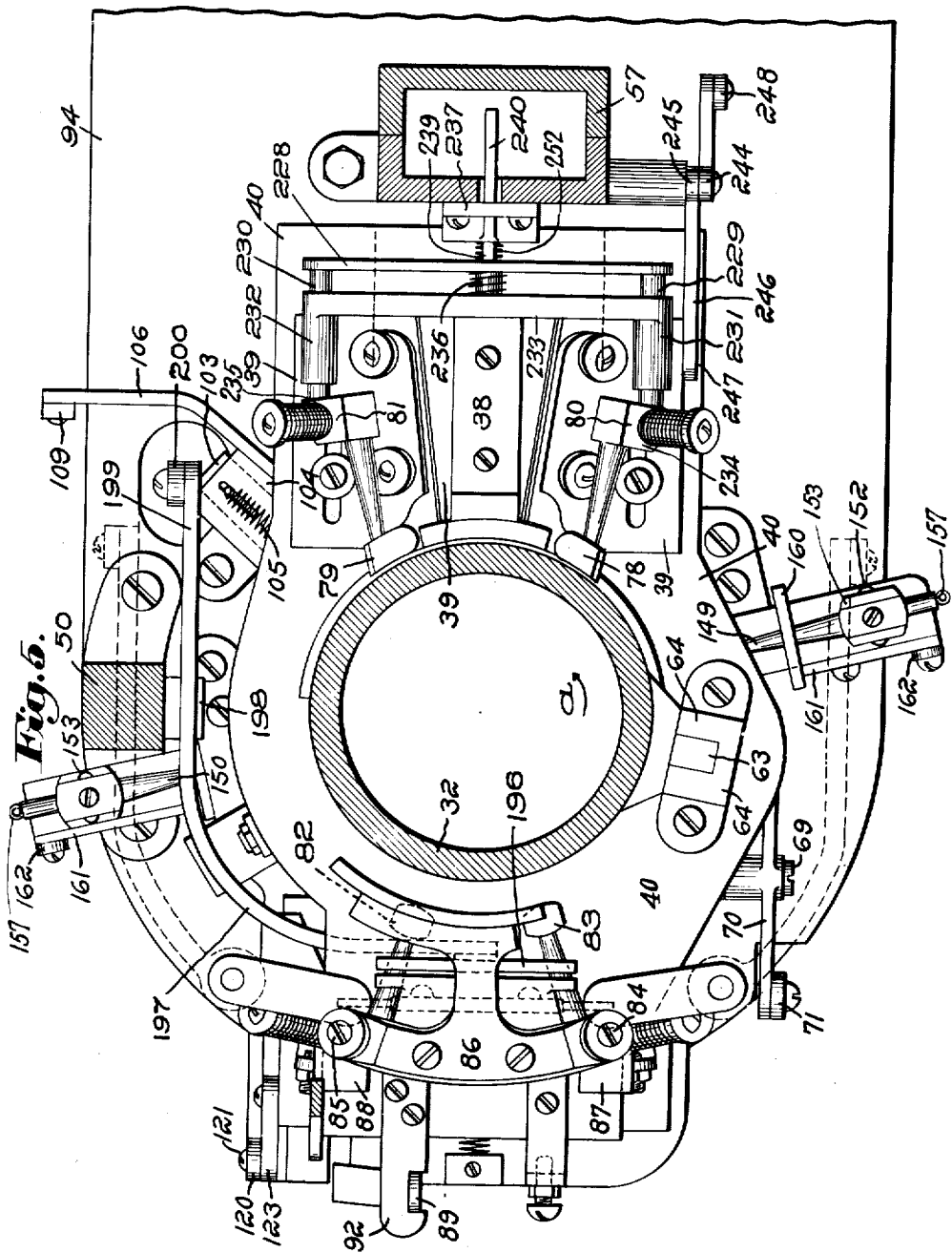

March 18, 1930.                J. LAWSON                1,751,450
                MACHINE FOR MAKING FASHIONED HOSIERY
                    Filed April 24, 1920    11 Sheets-Sheet 6
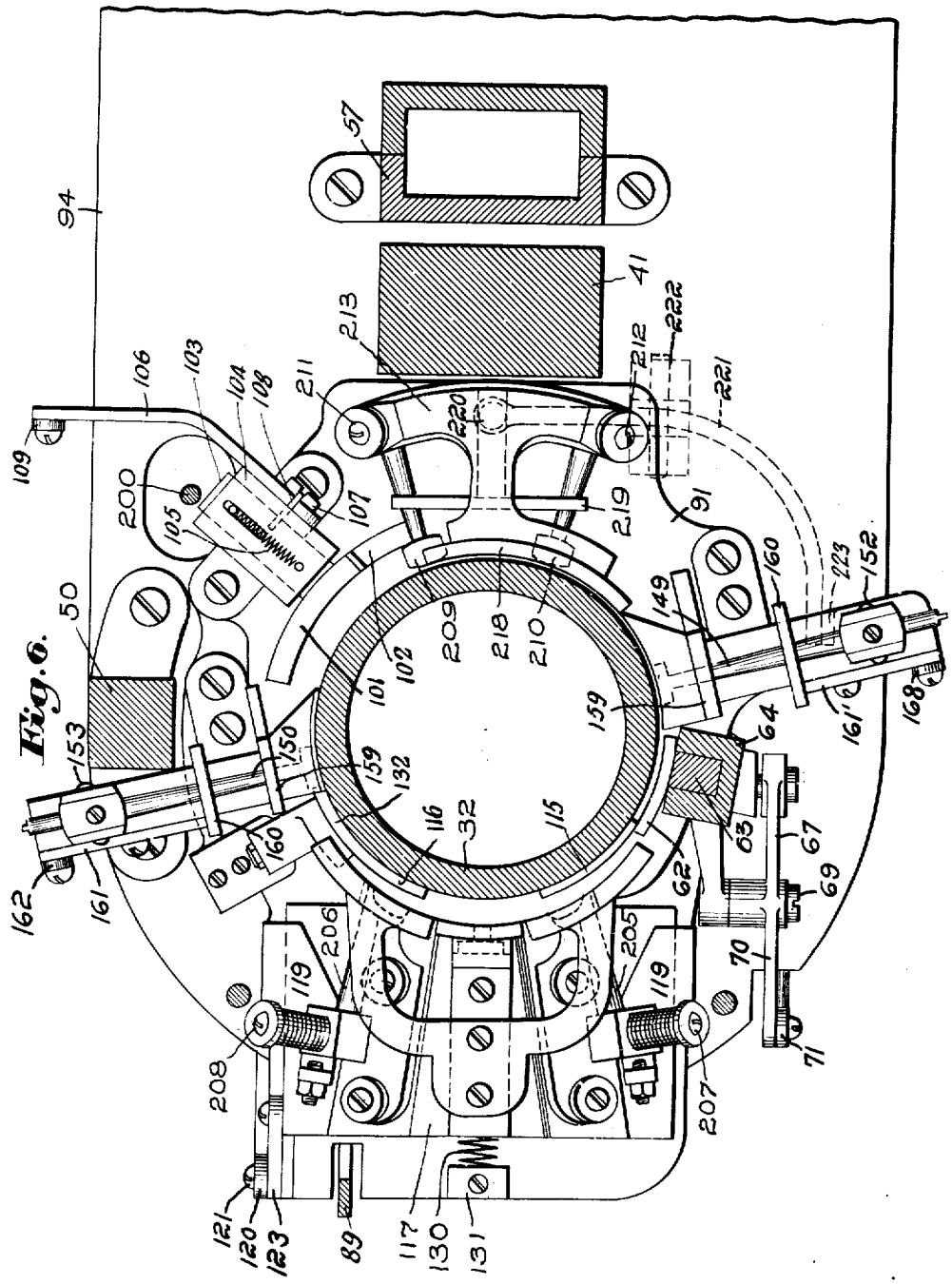
Inventor:
John Lawson,
by Emery, Booth, Janney & Varney,
Attys March 18, 1930.  J. LAWSON  1,751,450
MACHINE FOR MAKING FASHIONED HOSIERY
Filed April 24, 1920   11 Sheets-Sheet 7
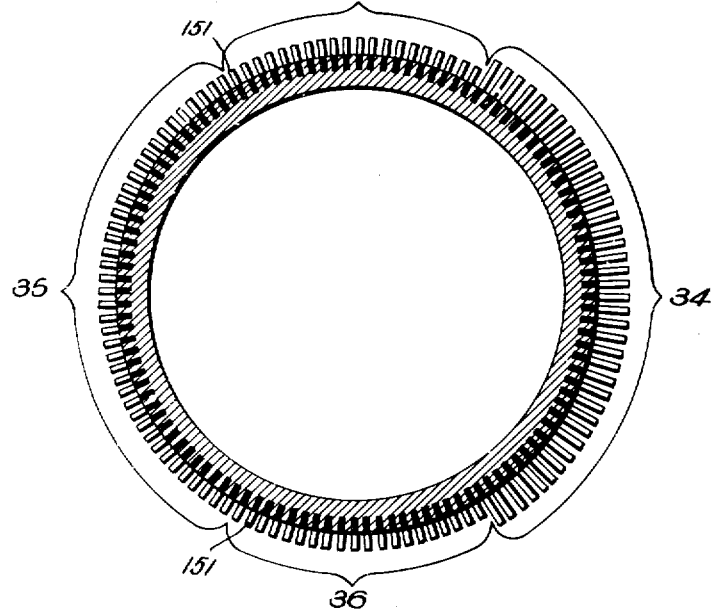
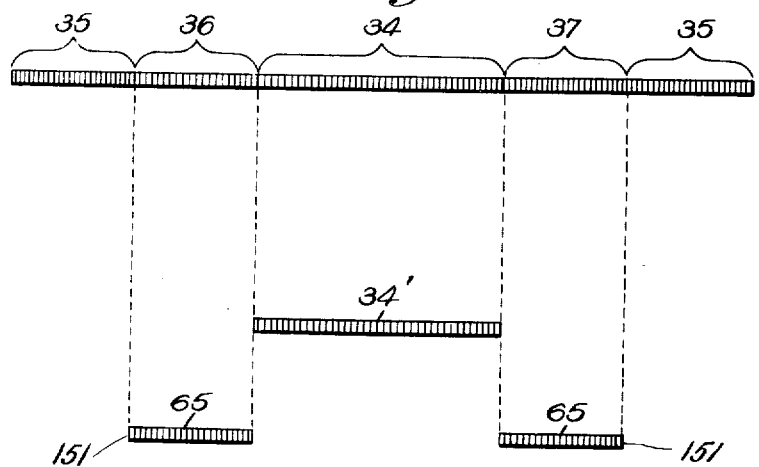
Inventor:
John Lawson,
by Emery, Booth, Janney & Varney
Attys.

March 18, 1930.  J. LAWSON  1,751,450
MACHINE FOR MAKING FASHIONED HOSIERY
Filed April 24, 1920  11 Sheets-Sheet 8
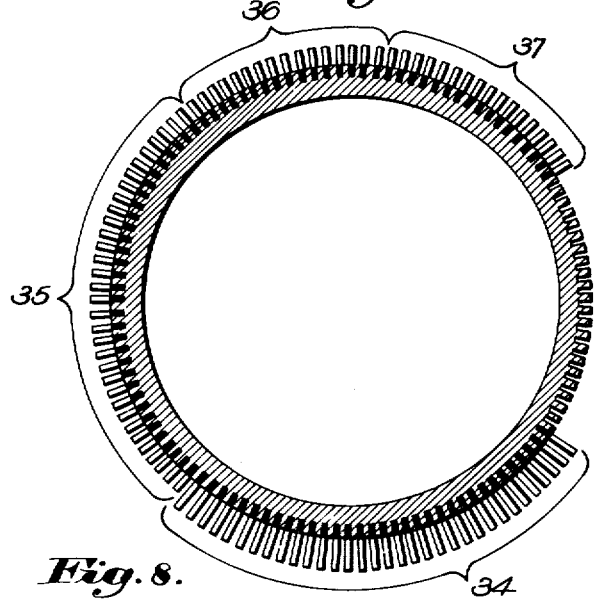
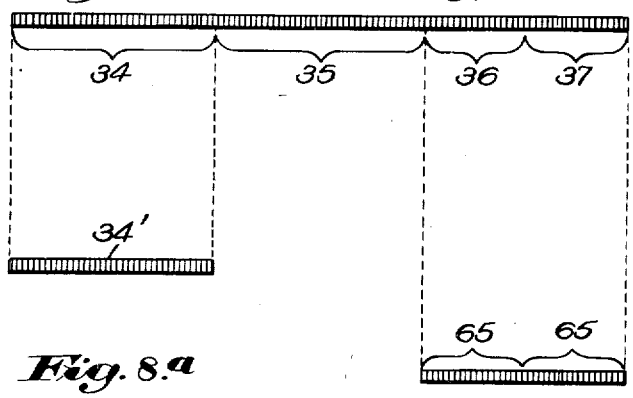
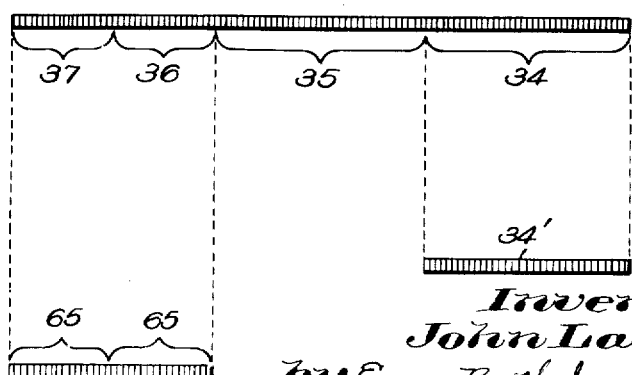
Inventor:
John Lawson,
by Emery, Booth, Janney & Varney
Attys.

March 18, 1930.  J. LAWSON  1,751,450
MACHINE FOR MAKING FASHIONED HOSIERY
Filed April 24, 1920   11 Sheets-Sheet 10
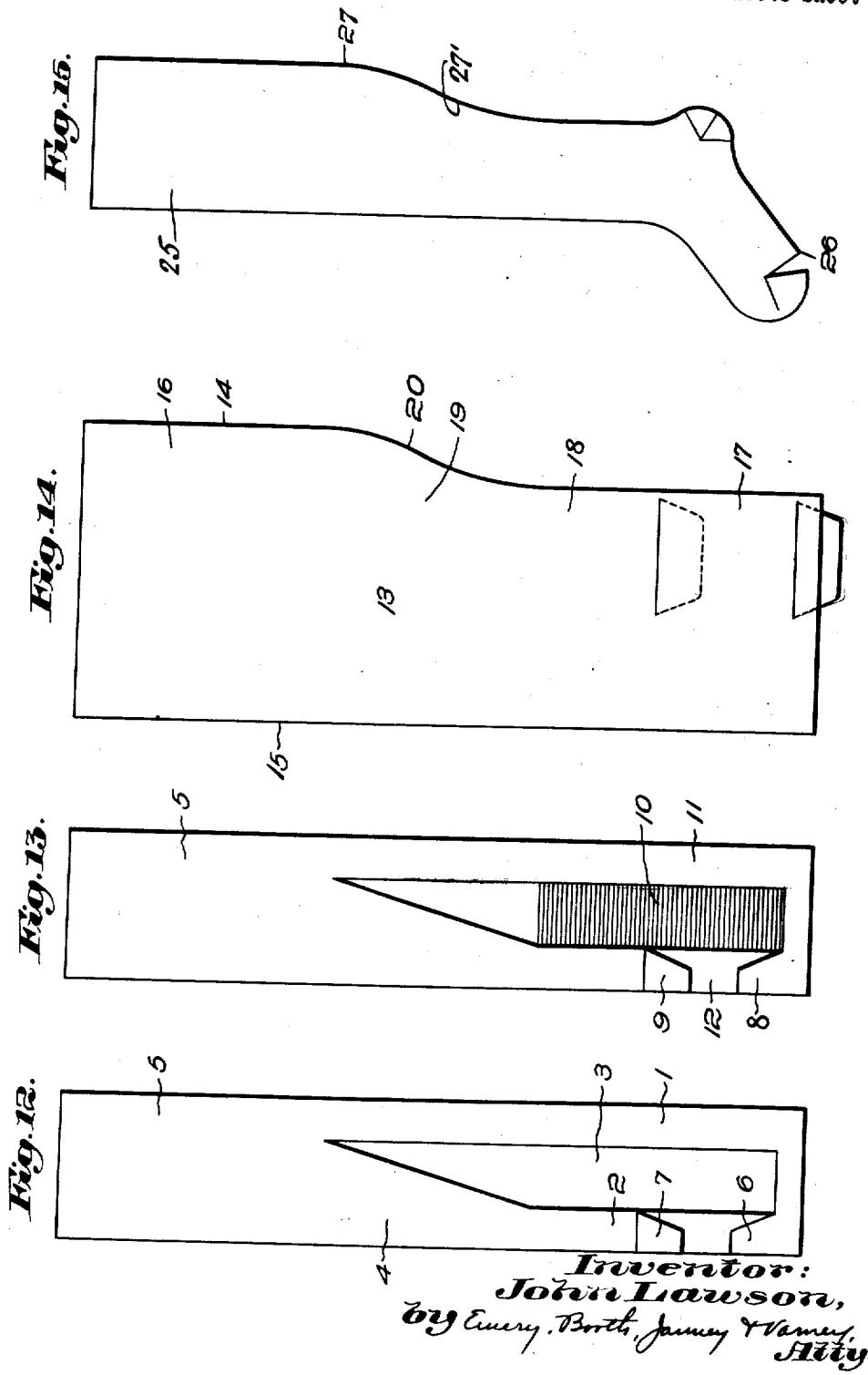

March 18, 1930.  J. LAWSON  1,751,450
MACHINE FOR MAKING FASHIONED HOSIERY
Filed April 24, 1920  11 Sheets-Sheet 11
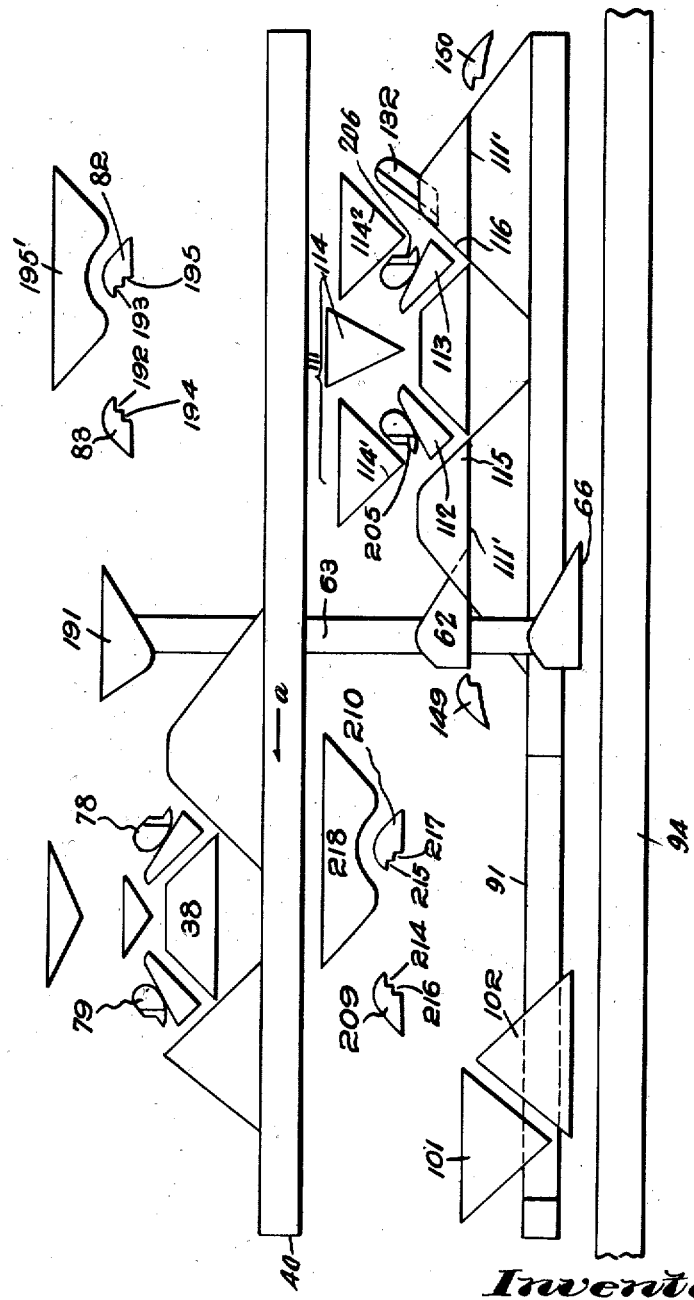
Inventor:
John Lawson,
by Emery, Booth, Janney & Varney
Attys.

Patented Mar. 18, 1930

1,751,450

UNITED STATES PATENT OFFICE

JOHN LAWSON, OF CENTRAL FALLS, RHODE ISLAND, ASSIGNOR TO HEMPHILL COMPANY, OF CENTRAL FALLS, RHODE ISLAND, A CORPORATION OF MASSACHUSETTS

MACHINE FOR MAKING FASHIONED HOSIERY

Application filed April 24, 1920. Serial No. 376,380.

This invention relates to knitting machines for making fashioned hoisery such, for example, as disclosed in the copending applications of George P. Bosworth, Serial No. 284,200, filed March 21, 1919, and Serial No. 317,067, filed August 12, 1919, and in the accompanying drawings I have merely for purposes of illustration disclosed a machine embodying the features of the invention, wherein,—

Fig. 4 is a front elevation on an enlarged scale of the upper portions of the knitting machine;

Fig. 5 is a horizontal section taken on the line 5—5 of Fig. 1 illustrating in plan the upper cam plate and the mechanism carried thereby;

Fig. 6 is a horizontal section taken on the line 6—6 of Fig. 1 illustrating the lower or secondary cam plate with cams and pickers mounted thereon;

Figure 11:
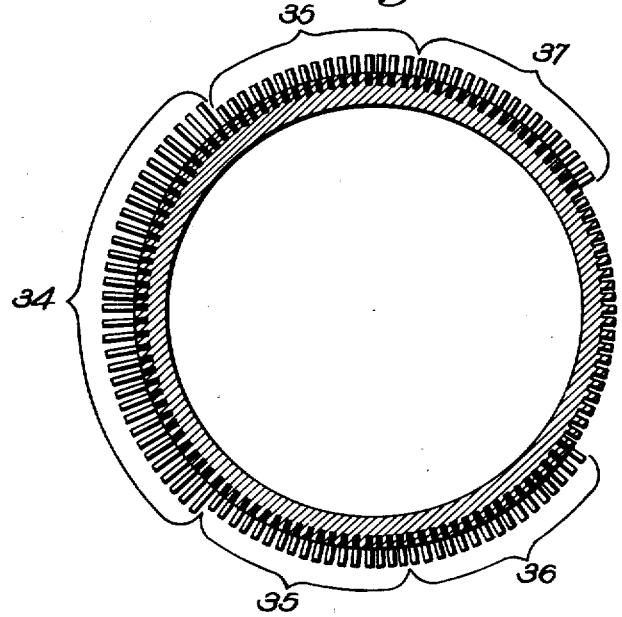
Figure 8B:
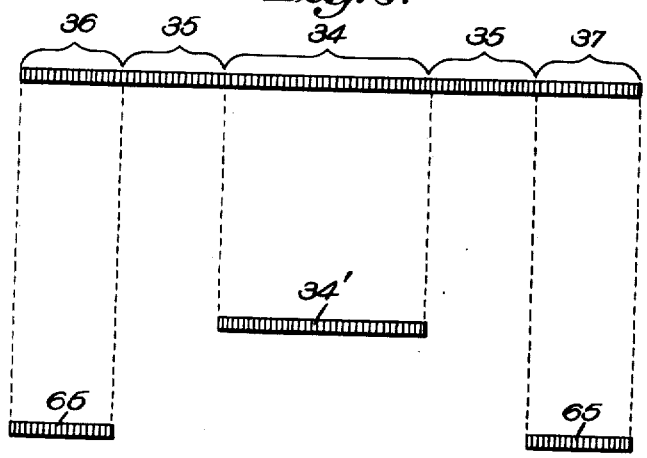

Figs. 7, 8, 8ª, and 8ᵇ are developments indicating different arrangements of the fashioning needles with relation to the instep and foot needles together with the jacks required to function said needles in the formation of the strips or sections of the several types of stocking blanks shown herein;

Fig. 9 is a circular diagram of the needles indicating the arrangement thereof for the production of the type of blank having seams at opposite sides of the foot and leg portions thereof, and indicating the different lengths of needle butts used;

Fig. 10 is a view similar to Fig. 9 illustrating the arrangement of the needles in a circular series when the machine is adjusted to knit stocking blanks having seams at one side only thereof;

Fig. 11 is a diagram similar to Figs. 9 and 10 illustrating the arrangement of the needles to form a stocking blank having a seam at the back of the leg and along the middle of the sole;

Fig. 12 is a side elevation in diagrammatic form of one form of blank used in the construction of a fashioned stocking having seams at opposite sides of the foot and leg thereof;

Fig. 13 is a side elevation in diagrammatic form of another type of blank adapted to be used in the formation of a stocking having seams at opposite sides of the leg and foot;

Fig. 14 is a development of another type of blank adapted to form a fashioned stocking having a seam at one side only of the calf, ankle and foot sections;

Fig. 15 is a side elevation of a fashioned blank adapted to be constructed by part rotary and part reciprocatory movements of the machine to form a stocking wherein the seam will extend down the middle of the back of the leg and the sole of the foot, the edges forming said seam being selvaged; and Fig. 16 is a development of the inner faces of the various knitting cams, the non-knitting cams and the narrowing and widening pickers employed in the practice of my invention.

The type of machine in connection with which I have elected to show my invention, is a circular knitting machine coresponding in many respects to that disclosed in the copending application of George P. Bosworth, Serial No. 263,289, filed Nov. 20, 1918, and also to that disclosed in the so-called Banner machine shown in the United States Patent to Hemphill No. 933,443, dated Sept. 7, 1909.

In Figs. 12 to 15, inclusive, I have illustrated various forms of blanks, to the knitting of which the machine embodying this invention is particularly adapted, and in order that the various mechanisms and functions of the machine may be more readily understood I will first describe the characteristics of said blanks and the methods by which they may be produced, although it is to be distinctly understood that the machine hereinafter to be described is not limited to the formation of articles disclosed. These blanks all embody similar characteristics such, for example, as a strip or section of fabric formed upon a series of needles less than the whole number used in the machine, which series is capable of being gradually increased until the full or nearly full complement of needles is in use to form the largest part of the stocking, or, as will be obvious, this operation may be reversed and the larger parts of the stocking blanks be knitted first, the fashioning needles whereof may be gradually decreased until only the desired number remain upon which to knit the smaller portions of the stocking blanks. In certain other respects, the several blanks shown differ quite materially from each other. For instance, the blank illustrated in Fig. 12 embodies two sections or strips 1 and 2 constituting the front and back, respectively, of the foot and lower leg portions of the stocking, and these strips are preferably produced upon the machine by reciprocating knitting and upon separate sets of needles whereby opposite edges of said strips will be selvaged, and these strips are furthermore separated at opposite sides of the blank by gaps 3 produced by withdrawing certain of the needles prior to the knitting of said strips. One of these strips, preferably the strip 2, is fashioned at the calf portion 4, herein by graually increasing the number of needles used in knitting said strip, until the entire number of needles have been restored, following which knitting proceeds upon the full complement of needles to produce the tubular section 5 integrally with and uniting the two sections 1 and 2. In one of said strips herein shown, as in the strip 2, are formed toe and heel pockets 6 and 7, respectively, said pockets being produced by the usual method of narrowing and widening.

The blank illustrated in Fig. 13 differs slightly from that of Fig. 12 by reason of the fact that in producing this blank the needle carrier and cams are relatively rotated throughout the entire operation, with the exception of the toe and heel pockets 8 and 9 and the fashioned portion of the calf, which are formed by reciprocating knitting, so that there will be floating yarns 10 connecting the adjacent edges of the sections of fabric 11 and 12 coresponding to the sections 1 and 2 of the blank shown in Fig. 12. Otherwise the formation of these two blanks is the same.

Fig. 14 discloses a blank produced entirely by reciprocating knitting and forming a strip 13 having oppositely selvaged edges 14 and 15 extending substantially the entire length thereof. The strip 13 is much wider at the top which constitutes the upper leg portion 16 of the blank, than it is at the foot and ankle portions 17 and 18, the intermediate or calf section 19 being fashioned as at 20 upon one side only of the blank.

Fig. 15 shows a blank formed as a strip from the toe pocket 26 to the top 27 of the leg, and the edges of said strip are selvaged. When the fashioning of the calf 27' is completed the machine is changed from reciprocating to rotary motion and the leg 25 is completed by rotary knitting.

In the drawings, 30 is the frame of the knitting machine having mounted thereon, and in a manner common to the socalled Banner machine disclosed in said Hemphill Patent No. 933,443, a driving shaft 31 from which the various instrumentalities of the machine receive their motion, and as the manner in which motion is imparted to said various mechanisms is substantially the same as in said Hemphill patent, no further description thereof is believed necessary.

Mounted upon the frame 30 of the machine is a needle carrier or cylinder 32 of the usual type, and herein constructed to rotate relatively to the knitting cams hereinafter described.

The needle cylinder 32 is capable of being both rotated and reciprocated, as is characteristic of stocking knitting machines, and particularly the Banner machine, supra. The needle cylinder 32 is provided with a full complement of knitting needles, the number thereof being sufficient to produce a section of tubular fabric constituting the upper leg portion of a fashioned stocking. These needles are provided with knitting butts of different lengths, such as are known as long and short butts. The long butts, in the present instance, are provided only for the needles used in forming the instep portion of the blank, the shorter ones being used to form the rear half of the tubular leg portion, the calf, ankle and the sole of the foot, and in most cases the heel and toe pockets of the blank.

In order to produce the various types of blanks hereinbefore described, it has been necessary to arrange the needles of said cylinder into various groups, and to provide special jack butts for said various groups whereby they may be brought into operation at the proper time to knit certain parts of the blanks. For example, in Fig. 9 wherein is represented the arrangement of the needles for producing the blanks illustrated in Figs. 12 and 13, the instep or long-butt needles are arranged in one group, as at 34, said needles, in the present instance, including about one-third of the needles of the entire set, and disposed diametrically opposite said instep needles is another series of short-butt needles 35 also arranged in a single group and containing about one-third of the full complement of needles. This arrangement of the two sets 34 and 35 of the needles produces between opposite ends of said series two short series 36 and 37, each containing approximately one-sixth of the entire number of needles in the cylinder, and these groups of needles are withdrawn from action during the formation of the sole of the foot and ankle portions of the blank and are gradually restored to action during the formation of the fashioned calf to gradually widen said calf, as previously described.

Figure 1:
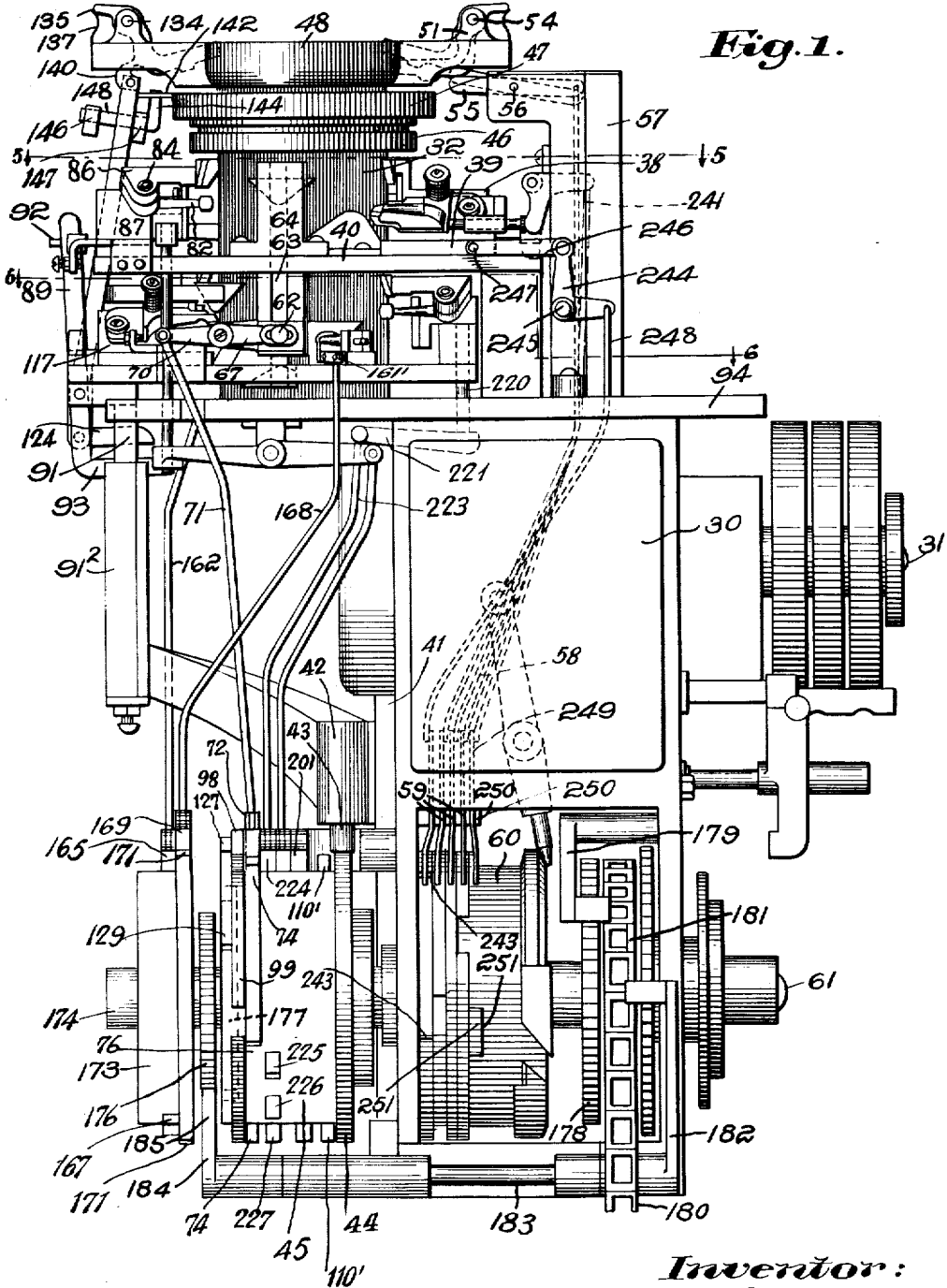
Fig. 1 is a front elevation of the machine.

Assuming that the machine is to be operated with the needles arranged as just described and shown in Fig. 9, to form the blank illustrated in Fig. 12, and that the machine is set to produce rotary knitting, motion is imparted to the cylinder 32 from the shaft 31 in the usual manner, and the needles are caused to function during said rotary movement by a set 38 of knitting cams, as most clearly shown in Figs. 1 and 5, said cams being substantially the same as the set of knitting cams illustrated in said Hemphill Patent No. 933,443, and so constructed as to act both upon the long butts of the instep needles 34 and the short butts of all other needles of the series which it is assumed are all in position to be acted upon during the relative rotary movement between said needle cylinder and said cams to knit tubular fabric.

The cams 38 are mounted upon a cam block 39 arranged for radial movement relatively to the needle cylinder 32 upon a cam plate 40 and in a manner to be hereinafter described.

The cam plate 40 is, as usual, secured to a vertical slide 41 arranged to slide in the frame 30 of the machine. At the lower end of the slide 41 is a holder 42 for the adjustable cam contact pin 43 adapted to engage a peripheral cam 44 upon a cam drum 45. The cam 44 engages the pin 43 and maintains the slide 41 in the desired position with respect to the cylinder of the machine, and this cam is suitably formed for permitting the lowering and raising of said cam plate and the cams thereon at desired intervals.

The needle cylinder 32 carries at its upper end the usual web holder supporting ring 46 and upon said ring is mounted the web holder cam support or cap ring 47 arranged and operated in the usual manner. A latch ring 48 is pivotally mounted at 49, see Fig. 2, upon a fixed bracket 50 secured to the frame of the machine, and carried by said latch ring are yarn guides 51, 52 and 53, see Figs. 1 and 4, said yarn guides being of the usual type pivoted at 54 upon said ring and adapted to be operated, respectively, from beneath by levers 55 pivoted at 56 in a suitable standard 57 mounted upon the frame of the machine. The levers 55 are, in turn, connected by rods 58 with suitable cam levers 59 pivoted upon the frame of the machine, while said cam levers are arranged to engage the periphery of a suitable pattern drum 60 mounted upon a shaft 61 in said machine frame and driven in the usual well known manner from the driving shaft 31.

It is obvious that a stocking blank such as that shown in Fig. 12, may be started at either end,—that is, knitting may begin by forming a tubular section of fabric upon the full complement of needles to produce the upper leg portion of the stocking, or, as herein shown, the knitting operations may begin at the toe and, in such a case, a number of circular courses are first knitted upon the full complement of needles as protective courses, and then certain of the needles of said cylinder may be withdrawn from action to form the toe pocket of the stocking. To accomplish this result, the instep needles 34, together with the two groups 36 and 37, are withdrawn and narrowing and widening proceeds upon the remaining set 35 to produce the toe pocket 6 of said blank.

To withdraw the needle group 34 from action, means are provided, herein consisting of an instep cam 62, see Figs. 4, 7 and 16, mounted beneath the cam plate 40 upon a slide 63 vertically movable in a bracket 64 carried by said cam plate. The cam 62 is positioned so as to engage only a series of long jack butts 34' upon jacks secured to the needles of the set 34.

The needles of the two series 36 and 37 are likewise provided with jacks having butts 65 arranged a substantial distance below the butts 34', as most clearly shown in Fig. 7 and these butts are adapted to be engaged by a cam 66 likewise secured to the slide 63 and operated simultaneously with the instep cam 62. The slide 63 is arranged to be operated at a suitable time in the operation of the machine, by a lever 67 pivotally attached at 68 to said slide and pivotally mounted at 69 to an arm of said bracket. The lever 67 as will be seen by referring to Figs. 1, 2 and 4 also has an arm 70 connected by a rod 71 with a cam lever 72 pivoted at 170 to a fixed portion of the frame. The lever 72 is arranged to contact with a peripheral rib 74 upon the cam drum 45, said rib 74 having suitable depressions 76 to allow the lever 72 to drop under the action of a spring similar to but directly in back of a spring 77, and thereby effect the raising of the slide 63 together with the cams mounted thereon. The drum 45 is attached to the shaft 61 to operate in unison with the drum 60. The depression 76 of the rib 74 is not intended as an accurate outlay of this cam but is merely to indicate its general arrangement.

The blanks shown herein, and particularly those in Figs. 12 and 13, have toe and heel pockets formed integral with the sole portion of the foot, and during their formation the instep needles must be withdrawn from action.

To produce the toe pocket, means are provided, in the present case consisting of narrowing and widening pickers similar in construction to those of the Hemphill Patent No. 933,443. The narrowing pickers which are two in number and shown at 78 and 79 in Figs. 5 and 16 are pivoted at 80 and 81, respectively, upon the primary cam block 39. These pickers are positioned at their inner ends to engage only the short-butt needles of the series 35 to effect the raising of said needles to form the narrowing for said toe pocket.

Figure 3:
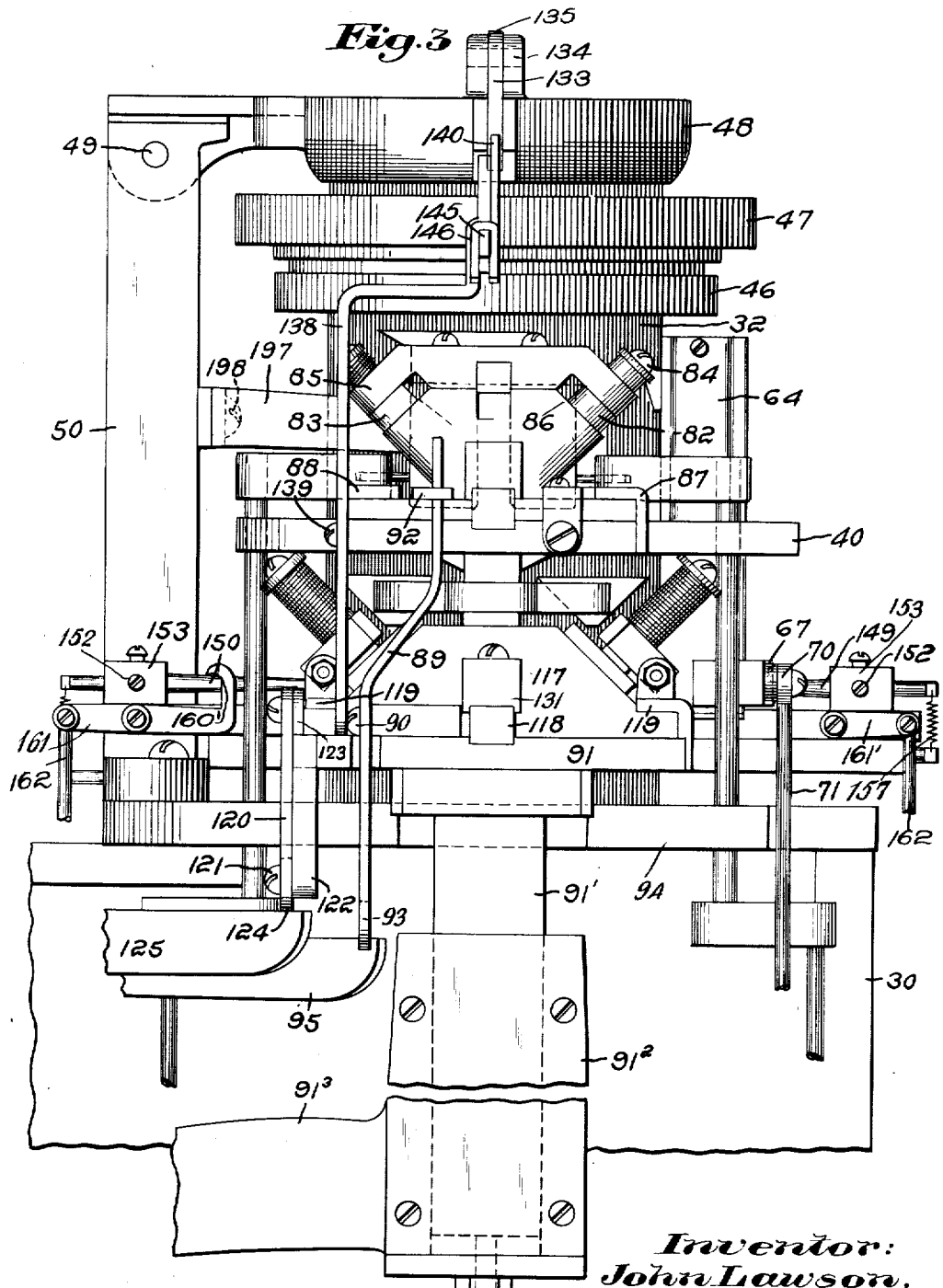
Fig. 3 is a left-end elevation on an enlarged scale of the knitting instrumentalities of the machine.

To effect the widening of said toe pocket, I preferably provide widening pickers 82 and 83 disposed upon the opposite side of the cylinder 32 from said main knitting cams and pivotally mounted at 84 and 85 upon a bracket 86, (see Figs. 3 and 5).

It is only at certain intervals during the operation of the machine that it is desirable to have the widening pickers 82 and 83 in operative relation to the cylinder 32. At other times said pickers are preferably withdrawn from such positions and held by means which I will now proceed to describe.

The bracket 86 is slidably mounted upon the cam plate 40 between guides 87 and 88. A lever 89 pivoted at 90 to a secondary cam plate 91, hereinafter more fully described, engages a notched plate 92 (see Fig. 5), which plate is attached to the sliding portion of the bracket 86. The lower end of the lever 89 is offset at 93, see Figs. 3 and 5, to project beneath the table 94 of the frame and into engagement with a lever 95 pivoted upon a stud 96 supported in a lug depending from the table 94 of the machine, see Fig. 2. A link 97 operatively connects the lever 95 with a cam lever 98 pivoted at 98' upon a stud fast to the machine frame, said lever engaging an appropriate peripheral cam 99 upon the cam drum 45. The cam drums 45 and 60 may be operated automatically by suitable pattern mechanism of any desired type, but preferably of the type shown in the Hemphill Patent No. 933,443. The cam lever 98 is maintained in yielding engagement with the cam 99 by means of a spring 100.

The operation of the pattern drums automatically takes place in the usual manner and at the proper time to effect the withdrawal of the instep needles 34 and also the two sets of needles 36 and 37 through their cams 62 and 66 hereinbefore described.

When the change takes place from rotary to reciprocating knitting, and the groups 36 and 37 are withdrawn from action together with the instep needles, so as to effect the formation of the toe pocket, it is desirable that the loops held by the needles of said sets 36 and 37 be immediately or very soon thereafter cast off, and for this purpose two cams 101 and 102 are provided in the path of the lower jack butts 65 of the groups 36 and 37 for the purpose of depressing said needles to a point where the loops will be cast and in subsequently raising said needles to their idle positions. These cams, which are best shown in Fig. 6 and 16, are arranged in any suitable vacant space upon the lower or secondary cam plate 91 upon a suitable slide 103 arranged to slide radially of the needle cylinder in a bracket 104, a spring 105 connected at one end with said slide and at the opposite end to a fixed portion of said bracket, tends normally and yieldingly to move said cams in the direction of said cylinder. To actuate said cams together with the slide to which the same are attached, in a direction opposed to said spring, a lever 106 is provided, said lever being pivoted at 107 preferably upon the said bracket 104. This lever is a bellcrank lever, one arm of which engages the pin 108 attached to said slide 103. The other arm of the lever is connected by means of a rod 109, to one end of a cam lever 110, see Fig. 2, pivotally mounted upon the stud 98' hereinbefore referred to. The opposite end of said lever is arranged to engage the periphery of the pattern drum 45 and to be periodically engaged by appropriate cams 110', see Fig. 1, secured to said drum, to effect the withdrawal of the cams 101 and 102 from their operative position. The cam 110' is not, however, intended accurately to appear in the drawings, it being shown merely to give a general idea of its location and arrangement.

At the proper time in the operation of the machine, and when the needles of the groups 36 and 37 are withdrawn to their idle level, the cams 101 and 102 are by the instrumentalities hereinbefore described permitted to move into operative position in the path of the jack butts 65, 65 of the two sets of needles 36 and 37. The first cam to be engaged by said needle butts is the cam 101 which causes said needles to be depressed sufficiently to cast the loops formed thereon, and immediately following the casting off of said loops the long jack butts of said needles will be brought into engagement with the cam 102, with the result that said needles are again returned to their idle position wherein they remain until it is desired to restore them to action to form the fashioning of the calf portion of the blank, as hereinafter described. Immediately following the casting of the loops from said needles, the cams 101 and 102 may be withdrawn from their operative positions.

The knitting upon the needles of the series 35 to form the toe pocket, is effected by the primary knitting cams 38, the needle cylinder being reciprocated through an arc sufficient to cause all of the needles of said set to engage said cams; but upon the completion of the toe pocket 6 of Fig. 12 and upon the restoration of the instep needles and the continuance of reciprocating knitting to form the two sections or strips of fabric 1 and 2, it is desirable to provide a secondary set of cams to effect the knitting upon said instep needles. As most clearly shown in Figs. 1, 2 and 16, I have illustrated such a set of cams 111 which is mounted upon the secondary cam plate 91, but upon the opposite side of the cylinder from the primary cams 38. The plate 91 may be supported in numerous ways, but herein it is shown attached to a slide 91' adjustably mounted in the end 91² of an arm 91³ forming a part of the holder 42 and movable therewith, thus maintaining the cam plate 91 the proper distance from the primary plate 40.

The cams of said secondary set are substantially the same as those of the primary set, both of which sets are fully shown in Fig. 16 and operate in a manner similar to those of the Hemphill Patent No. 933,443. That is, these cams consist of knitting cams 112, 113, a center guide cam 114, and raising cams 115, 116 to cooperate with said knitting cams 112, 113, respectively.

When the machine is rotatively knitting and the primary needle cams are operating upon all of the upper butts of Fig. 7, as for example when knitting a tube, the secondary cams 111 are withdrawn from action so that the jack butts 34' of the instep needles which are the only butts capable of co-acting with said secondary cams, will not be engaged by said cams.

To effect the withdrawal of said cams 111 at the proper time, I have mounted the cam block 117 which carries said secondary cams to slide upon the cam plate 91 radially with respect to the needle cylinder, see Figs. 3 and 6. The block 117 is guided during its radial movement by a key 118 arranged longitudinally of said block partly in said cam plate 91 and in part in said block. The block is maintained in its sliding engagement with said key by angle plates 119 arranged at opposite sides of said block. A lever 120 is pivoted at 121 to a bar or fixed plate 122 depending from the plate 91. One arm of said lever 120 extends upwardly and is connected by a link 123 with the cam block 117. An arm 124 of said lever projects beneath the table 94 of the knitting machine and into engagement with the end of a lever 125 best shown in Fig. 2 pivoted at 96 to a fixed part of the frame. The opposite end of the lever 125 is connected by a link 126 with a cam lever 127 pivoted at 98' to a fixed portion of the machine frame. A spring 128 tends to maintain the cam lever 127 in engagement with the periphery of the cylindrical cam drum 45. Movement is imparted to said lever 127 at certain times in the operation of the machine by a cam 129 merely indicated in a general way upon the drum 45, and in the present instance said cam lever is engaging said cam and maintaining the cam block 117 in its retracted position.

When the cam lever 127 is released by its cam 129, the cam block 117 will be forced toward the needle cylinder into its operative position by means of a spring 130, see Fig. 6, arranged within a recess formed in the end of said cam block and engaging at its rear end a stop 131 secured to the plate 91. When the cams 111 are released by the mechanism just described and permitted to move into operative position against the needle cylinder, the butts 34' of the needles 34 will co-act therewith to knit the strip of fabric including the instep of the foot and the front of the ankle and leg thereof, thus to form the strip 1 of Fig. 12, and the release of said cams preferably takes place immediately following the completion of the toe pocket 6 of said blank, the machine at this time being operated reciprocatingly.

The jack butts 65, 65 of the groups 36, 37 are disposed far enough below the butts 34' so as to pass beneath the edge 111' of the secondary cams 111 and not be actuated thereby.

At about this time in the operation of the machine, it is desirable to deflect the upper butts of the needles 34 to the upper or idle level in order to prevent said butts from co-acting with the primary cams 38 during said reciprocating knitting, and here I employ the instep cam 62 hereinbefore described, which cam is moved up by its operating devices so as to cause said instep needles to be raised, on the backward movement of the needle cylinder, slightly in advance of said primary cams. Thus it will be seen that during the reciprocating movements of the needle cylinder, with said instep knitting butts 34 at the upper level, they will pass over said primary cam without being actuated thereby, but as said needles approach the secondary cams, assuming that said cams are in their operative positions against said needle cylinder, the jack butts 34' thereof will be moved into engagement with said secondary cams by the wing cams 114' or 114² and be actuated thereby in the usual manner to knit the strip 1 of said blank, and upon the opposite side of the knitting cams 111 from said cam 62 I have provided a switch cam 132 which immediately raises said instep needles to their upper or idle level after they leave said cams 111 in moving in the forward direction.

It will be obvious that inasmuch as the needles of the series 35 have not been provided with lower or jack butts, that said needles will pass by the secondary cams 111 without being actuated thereby, the result being that said needles 35 will be actuated only by the primary knitting cams and the needles 34 only by the secondary knitting cams to produce their respective strips or sections of fabric 1 and 2.

To cooperate with the knitting cam 111 in the formation of said strip 1, I provide a secondary yarn guide 133, see Figs. 3 and 4, which is pivoted in the latch ring 48 upon a pin 134, said yarn guide being normally maintained in its operative position by any suitable instrumentalities such as I have illustrated in Fig. 4 and including an extension 135 on said yarn guide arranged to engage a spring 137 attached to the latch ring.

When the knitting cam block 117 is withdrawn from action it is desirable that the yarn guide 133 be likewise withdrawn from action, and I therefore provide means whereby said yarn guide may be withdrawn at the same time and by the same means whereby I withdraw said cam block, said means consisting of a lever 138 pivoted at 139 to a portion of the upper cam plate 40. This lever extends downwardly and into engagement with the outer end of the cam block 117 so as to be rocked upon its pivot during the outward movement of said cam block. The upper end of the lever 138 has an extension 140 of suitable construction to engage a projection 141 formed on the under edge of the yarn guide 133, whereby when said lever 138 is rocked by the movement of said cam to its retracted position, said yarn guide 133 will be raised to withdraw its yarn from cooperation with the needles of the machine.

Where a secondary set of knitting cams is employed, it is desirable that the web holders of the machine be actuated at the proper time and in conjunction with the needles that are co-acting with said secondary cams. To accomplish this result I arrange a slide 142 transversely of the cap ring 47, as most clearly shown in Figs. 1 and 4. The outer end of the slide 142 has a segmental slot 143 formed therein to receive the end 144 of a supplementary slide 145 mounted at the upper end of the lever 138. The slide 145 is provided with two adjustable stops 146 and 147 placed at predetermined distances apart to allow a certain amount of lost motion to take place between the lever 138 and said slide, as the movement of said lever 138 is greater than that required to operate said cam 142. By the arrangement described it will be evident that the stops 146 and 147 will automatically adjust themselves so as to impart to the cam slide the required amount of movement.

To the under side of the slide 142 I secure the secondary web holder cam 148 as shown most clearly in Fig. 4.

With the primary and secondary cams and their yarn guides in operative position, knitting will proceed to form the strips 1 and 2, until the point in the foot is reached where the heel pocket 7 is to be produced, when knitting upon the instep needles is stopped by withdrawing from action said secondary knitting cams and allowing said instep needles to remain at their upper or idle level. At this time in the operation of the machine, the narrowing pickers 78 and 79 are permitted to act upon the needles of the series 35 to narrow the desired number of courses and upon completion of said narrowing operation the widening pickers 82 and 83 will act to effect widening in a manner well known to those skilled in the art.

Next in the operation of the machine, the secondary knitting cams may be and preferably are restored to action and knitting proceeds upon both primary and secondary sets of needles to knit the front and back strips constituting the ankle of the stocking until the point is reached where fashioning of the calf is to begin, at which point it is desirable to bring into operation a certain number of needles of the fashioning sets 36 and 37, see Fig. 7. In the present instance, means are provided for bringing into action one needle of each of the groups 36 and 37, thus increasing the needles of the group 35 by two needles, and knitting may then proceed upon this increased number for any desired number of courses, such, for example, as five courses, and other needles, preferably two, are added to said group to still further increase the width of the strip, and this may be continued until the entire needles of the groups 36 and 37 have been restored to action. For this purpose I have provided picker means 149, 150 arranged at suitable positions with respect to the butts 65 of the two groups of needles 36 and 37, so as to engage said butts beginning at the ends 151 of said groups (see Figs. 7 and 9), thereby increasing the width of the strip 2 instead of the strip 1 so as to add all of the fullness to the rear or calf portion of the stocking.

The positions best suited for accomplishing the desired result in this respect, and especially in connection with the needle group arrangement shown in Fig. 9, will be seen by referring to the full line positions of the pickers 149, 150 in said Figs. 6 and 16. The construction of the pickers employed for this purpose may be in accordance with any of the well known forms of pickers, but herein I have shown each of the pickers 149, 150 similarly mounted upon a horizontal pivot 152 in a block 153. A stud 154, see Fig. 4, is attached to said block and is arranged in pivotal engagement with a socket 155 in a suitable support 156. A suitable spring 157 is provided tending to elevate the inner or active end of said picker and said end is guided downward against the stress of said spring owing to the conformation of the recess 158 in a guide plate 159 mounted in fixed relation to the cam plate 91.

Under ordinary conditions, that is, during the formation of the straight portions of the strips 1 and 2 prior to the widening or fashioning thereof, the pickers 149, 150 will be depressed slightly below the positions shown in Fig. 16 so that the butts of the needle groups 36 and 37 may be moved with the needle cylinder without being actuated by said pickers. Any suitable means may be provided for accomplishing this result, but herein I have shown the picker 150 provided with a hook-like member 160 indicated most clearly in Figs. 2, 3 and 6, which is operatively connected to a lever 161 itself pivotally attached to an upright rod 162 that, in turn, is pivotally connected at its lower end to an arm 163 of a lever 164 pivoted to a fixed portion of the machine frame. The opposite arm 165 of said lever is maintained in engagement with the face of suitable cams 167 upon a cam drum 173 (see Figs. 1 and 2) and hereinafter more fully described by means of a spring 166 and is raised at certain times in the operation of the machine by said cams 167, which latter are merely indicated upon the face of said drum to show their general location, there being no intention to show the same in their accurate positions.

The instrumentalities just described are those used to operate the picker 150, whereas the means for operating the picker 149 consist of a link 168 which extends directly from a lever 161' similar to the lever 161 of the picker 150 to a cam lever 169 pivoted at 170 to a fixed part of the machine, said pivot also constituting the pivot for the lever 164. The cam lever 169 engages appropriate ribs 171 upon the periphery of the cam drum 173 and is operated at suitable times in the operation of the machine to drop the end of said lever 169 against the face of said cam drum 173, said cams not being accurately located in the drawings. The levers 169 and 165 operate in opposite directions, one moving up while the other is moving down and vice versa.

The cam blocks 171 effect the raising of the rod 168 and thereby depress the active end of the picker 149, and to operate said lever in the opposite direction I provide a spring 172 attached to the opposite end of the cam lever 169 from the cam-engaging end thereof, and to a fixed portion of the frame.

During the operation of the machine and at a time when the pickers 149, 150 are in their operative positions, the reciprocations of the needle cylinder cause the butts 65 of the two groups 36 and 37 to move toward the back inclined upper face of the first picker in their path and depress it, then passing on to their respective pickers, whereupon the first butts of the groups 65 at the ends 151 thereof will engage the notch therein and be restored to the lower normal level whereby the upper needle butts thereof will be engaged by the primary knitting cams 38 and caused to knit in the usual way.

Immediately following the restoration of the first needles of the groups 36 and 37, it may be desirable to knit a number of courses upon the series of needles to which the end needles of the groups 36 and 37 have just been added, in order to make the widening more gradual. When such is the case, it is desirable to immediately withdraw the pickers 149 and 150 so that the next movement of the needle cylinder will not add two more needles to said set.

Figure 2:
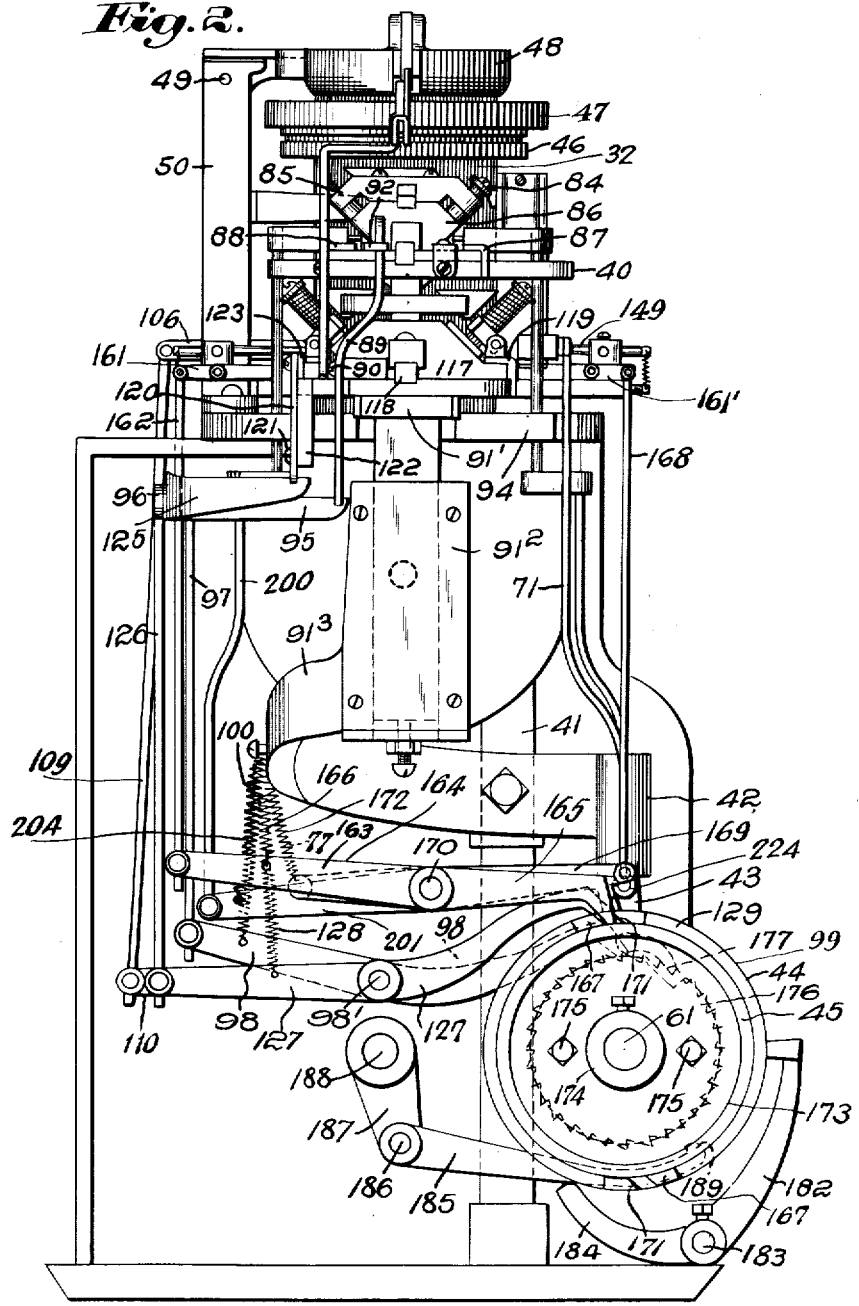
Fig. 2 is a left-hand end elevation of the knitting machine.

To accomplish this result, I provide an additional pattern drum hereinbefore referred to as 173 and illustrated most clearly in Figs. 1 and 2. To this drum motion is imparted by means capable of operating the same independently of the drums 45 and 60. Herein I have represented said cam drum 173 as loosely mounted upon the shaft 61, being held in position thereon between the cam drum 45 and a collar 174 fast on said shaft 61. Bolted to one side of the cam drum 173 by bolts 175, is a ratchet wheel 176, herein provided with thirty-six teeth. At one side of said ratchet wheel and secured thereto and to the cam drum 173 by suitable bolts, is a ratchet wheel 177, which in this embodiment of my invention is provided with one tooth, as indicated in Fig. 2. The ratchets 176 and 177 are loosely mounted upon the shaft 61.

As most clearly shown in Fig. 1, the shaft 61 has fast thereon the usual ratchet wheel 178 herein provided with thirty-six teeth. This ratchet is driven by pawl mechanism not herein illustrated, but preferably the same as in the well known Banner machine and substantially the same as shown in said Hemphill Patent No. 933,443.

The driving pawl for the ratchet 178 is controlled in its movement by a pivotal pawl-like member 179 suitably mounted and the movements of which are controlled by the usual pattern chain 180 in the usual well known manner not herein necessary more fully to describe.

Upon the pattern chain 180 I provide a special lug 181 adapted to periodically engage a pawl 182 secured to a shaft 183 arranged to rock in suitable bearings on the frame of the machine. Mounted upon said shaft 183 is also an arm 184 fast thereto and adapted to be swung upward against a pawl 185 pivoted at 186 upon a lever arm 187 fast upon the usual quadrant shaft 188 for imparting movements of reciprocation to the needle cylinder.

The tooth 189 of the pawl 185 is adapted to be lifted periodically by the lug or arm 184 so as to engage the teeth of the ratchet 176. When the lug or arm 184 is not elevated, the pawl 185 reciprocates idly and no movement is imparted to the ratchet 176 or to the cam drum 173.

At proper intervals, that is when it is desired to bring the widening pickers 149 and 150 into action, the pawl 185 is elevated momentarily and a slight movement of partial rotation is imparted to the cam drum 173, which drum is provided with suitable cams, as shown at 167, 171 most clearly shown in Fig. 2, which cams cause the widening or fashioning pickers at the proper time to become active, as previously stated.

Inasmuch as the cam drum 173 is loose upon the shaft 61, it is evident that means are necessary to preserve the same in its proper circumferential relation with respect to the cam drums 45 and 60, and for this purpose any suitable means may be employed, such, for example, as I have disclosed in my co-pending application Serial No. 266,481, filed Dec. 12, 1918, to which reference may be had for further information relating thereto.

In view of the construction just described it will be obvious that the pattern or cam drum 45 will impart to the cam drum 173 all its own movements of partial rotation and that the same cam drum 173 may be moved incrementally forward at the proper time so as to bring the proper cam into operative relation to the widening picker mechanism.

The gradual widening of the strip 2 of the fabric continues until all of the needles of the two groups 36 and 37 have been restored to action, and when this has been accomplished I then, in the present instance, proceed to knit upon all of the needles to form the tubular section of the fabric constituting the upper leg 5. As the formation of the two strips 1 and 2 of fabric takes place upon separate sets of needles, it is necessary, before circular knitting proceeds further, to effect the restoration of the series 34 of the needles, so that the knitting butts thereof will be engaged preferably by the cams of the primary sets 38 and about this time to withdraw from action upon the butts 34' of said needles 34 all the secondary cams 111.

As I have previously described, the secondary cams 111 are mounted to be moved radially with respect to the cylinder, and the means for accomplishing this result, namely, the levers 120, 125, link 126, cam lever 127 and cam 129 (see Figs. 1 and 2), I now bring into operation to withdraw said cams 111 from the path of the jack butts 34', and to restore the needles 34 to positions where they may be acted upon by the primary knitting cams I have mounted upon the slide 63 of the instep cam an upper instep cam 191 shown most clearly in Figs. 4 and 16.

The cam 191 is lowered, together with the cams 62 and 66, by the operating instrumentalities including the lever 67, link 71, lever 72, cam 74 and spring 77 hereinbefore described, and whereby said cam 191 will be brought into the path of the long knitting butts of the needles 34 and effect the deflection thereof to the lower or knitting level. The machine is now in condition to complete the knitting of the tubular section 5 of the blank.

As previously stated, the two sections of fabric 1 and 2 are produced by reciprocating knitting,—consequently selvages will be formed at each edge of both the said strips, and in the present machine I have provided means to make a more perfect selvage which consists in forming upon the end needles of each of the series employed in knitting said strips 1 and 2 complete loops and partial loops, both of which are substantially twice the length of the ordinary loops of fabric, and these loops are simultaneously interknit with successive double loops formed upon said needles so that a continuous chain of double loops will be formed extending along each edge of the strips 1 and 2, thus providing uniform edges which may later be stitched or seamed together to complete the formation of the stocking. The selvages thus formed upon the strips 1 and 2 constitute what I term reinforcing selvages.

To form the loops constituting said selvages, I herein provide means to cause the end needles of each of the series 34 and 35 of Fig. 7 to be raised so that the loops thereon will be held over one movement of the needle cylinder, a reverse movement of said cylinder effecting the restoration of said end needles so as to cause the yarn previously fed thereto to be laid around the shanks of said end needles and knitted with the previously formed loop into the loop formed on said needles during the next movement of said needle cylinder.

The means employed for functioning the terminal needles of the group or series 35 herein includes the narrowing pickers 78 and 79 hereinbefore described as being mounted upon the primary cam block 38 in the manner common to said Banner machine, and in addition I also make use of the widening pickers 82 and 83 which I have previously described as being mounted upon the radially movable bracket 86. Under ordinary conditions the pickers 82 and 83 are withdrawn by the mechanism hereinbefore described from positions close up to the cylinder where they will act upon the butts of the needles and are moved into such positions only for the widening of the toe and heel pockets of the stocking. Furthermore the active ends of said pickers have recesses 192 and 193 (see Fig. 16) of a depth sufficient to receive two needle butts, so that two needles may be restored to action during the ordinary widening operations, but in the present case where the selvages are to be formed it is desirable that but one needle be restored by each of said pickers and the needle so restored is one which was previously raised by the narrowing picker corresponding thereto. For instance, during the movement of the needle cylinder in the direction of the arrow a, Figs. 5 and 16, the knitting butt of the first of the group of needles 35, which have short butts, while approaching the knitting cams 38 will engage the picker 78 and be carried thereby over the tops of the cams 38, without forming a stitch riding over the picker 82 during said movement, but upon the return movement of said cylinder the butt of the needles thus elevated by the picker 78 will engage said picker 82 and be restored to its operative or knitting level. When in its raised position, the end needle of the series 35 will be at the end of the series of needles constituting the group 36, Fig. 7, which group at this time is likewise at the upper or idle level, and unless the recess in the end of the picker 82 is made small enough to receive only a single butt, one of the needles of the group 36 upon said reverse movement of the needle cylinder will also be depressed. To guard against this, the picker 82, as shown in Fig. 16, is provided with a single butt-receiving recess 195 placed slightly below the recess 193 and adapted to receive only one needle butt. Similarly the picker 83 is provided with a recess 194 also adapted to receive only one needle butt, so that the needle at the opposite end of the series 35 of Fig. 7 may, in a similar manner, be acted upon by the pickers 79 and 83 to form the selvage at the opposite edge of the strip 2 of Fig. 12. It, therefore, is desirable to provide means for adjusting the active ends of the pickers 82 and 83 to bring either of the sets of notches thereof into cooperation with the needles and into proper alignment with a needle-butt truing cam 195' of the usual type.

To accomplish the raising and lowering of the active ends of said pickers 82 and 83, I have herein shown what is usually called a butterfly cam 196, see Fig. 5, attached in the present instance to a lever 197 pivoted at 198 to the fixed bracket 50 whereon is mounted the latch ring 48. The lever 197 has an arm 199 extending beyond the pivot 198 to which arm is attached a rod 200 extending downwardly through an opening in the table 94 and into engagement with one end of a cam lever 201 pivoted upon the stud 170, best shown in Figs. 1 and 2. The opposite end of said cam lever 201 extends forwardly and into engagement with the cam drum 45 operated as hereinbefore described and upon the surface of which are cams 202 and 203 of different heights and placed at suitable locations on said cam drum to operate the cam lever 201 to properly position the recessed ends of the pickers 82 and 83 for the actuation of the needles both for narrowing and widening and for forming the selvaged edge referred to, no attempt being made in the drawings to accurately form and position said cams.

The cam lever 201 is operated in a reverse direction to that effected by the cams 202 and 203 by a spring 204 which normally maintains said lever in contact with the periphery of said cam.

The mechanism just described is used only in forming the selvages of the strip 2, but it is also desirable to form selvages upon opposite sides of the strip 1, which latter strip is produced upon the needles of the series 34 of Fig. 7 which are at this time actuated by the secondary cams 111. Therefore I provide narrowing pickers 205 and 206 (see Figs. 6 and 16) pivoted, respectively, at 207, 208 upon the cam block 117 to operate upon the needle butts that are functioned by the secondary cams 111 when the latter are in their operative positions substantially as do the pickers 78 and 79 of the primary cams.

On the opposite side of the needle cylinder from the secondary cams 111 I have provided widening pickers 209, 210, see Figs. 6 and 16, adapted to cooperate with the narrowing pickers 205, 206 in producing the selvaged edges at opposite sides of the strip 1. The pickers 209, 210 are each pivotally supported at 211, 212, see Fig. 6, upon a suitable bracket 213 attached to a portion of the cam plate 91. The heads or active ends of the pickers 209, 210 are, as most clearly shown in Fig. 16, provided with two recesses 214, 215 indicating the upper sets of recesses which are adapted to engage the butts 34' of Fig. 7 when it is desired to produce narrowing and widening upon said instep needles as hereinafter referred to, and a lower set of recesses 216, 217 in said pickers 209, 210, respectively, are utilized only during the formation of the selvages along opposite sides of said strip 1. The recesses 214, 215 are of a depth sufficient to receive two needle butts, as in the ordinary widening operation, whereas the lower recesses 216, 217 of said pickers are arranged only to receive single butts and for the purpose and in the manner described in connection with the pickers 82 and 83.

It is desirable to provide means for raising and lowering the active ends of the pickers 209, 210 to properly align the said recesses therein with a cam 218 provided for the purpose of truing the needle butts, or, in the present case, the jack butts 34' that are carried upwardly into the idle positions thereof. It is also desirable to provide means to move said pickers entirely out of action as, for instance, when the instep needles 34 are in their upper positions during the formation of the toe and heel pockets 6 and 7. For this purpose I provide a butterfly cam 219, see Fig. 6, similar to the corresponding cam of said Hemphill Patent No. 933,443, and adapted to be moved vertically to its various positions by means of a rod 220 most clearly shown in Figs. 1, 4 and 6 and which rests at its lower end upon a lever 221 pivoted upon a bracket 222. At its outer end the lever 221 is pivotally connected to the upper end of a rod 223, said rod having connection at its lower end with a cam lever 224 pivoted upon a stud 170 and arranged at its opposite end to engage the periphery of the cam drum 45 whereon are mounted suitable cams 225, 226, 227 for operating said butterfly cam to position the ends of the pickers with respect to the truing cam 218 and to withdraw said pickers from active cooperation with the jack butts 34'. It is, however, to be understood that no attempt has been made to accurately show said cams 225, 226 and 227 in the drawings.

When the machine is to operate to produce the blank illustrated in Fig. 13, which, as hereinbefore stated, is formed entirely by rotary knitting except as to the toe and heel pockets 8 and 9, the secondary knitting cams 111 are not required, therefore they are withdrawn by means of the instrumentalities hereinbefore described including the levers 120, 125 and 127 and cams therefor from active cooperation with the jack butts 34' of the instep needles, which instep needles at this time co-act with the primary knitting cams 38 to produce the strip 11. The groups 36 and 37 are, however, actuated in the same manner as described in connection with the blank in Fig. 12, and by withdrawing said needles from action and in causing them to cast their loops it will be obvious that the floating yarns 10 will be formed connecting opposite adjacent edges of the strips 11 and 12.

No selvage edges being formed upon said strips 11 and 12, at least up to the point where fashioning of the calf begins, the narrowing pickers 78 and 79, and also the widening pickers 82 and 83, will not be required and may be withdrawn, the said widening pickers by the instrumentalities hereinbefore described, and the narrowing pickers by means herein shown in Figs. 4 and 5 as consisting of a bar 228 horizontally positioned in the rear of the cam block 39 and having plunger-like members 229, 230 extending inward therefrom through suitable sockets 231, 232 in a frame 233. At their inner ends the said plungers 229, 230 engage pivotal portions 234, 235 of said pickers 78 and 79 so as to swing them upwardly into the inactive positions thereof. A spring 236 shown most clearly in Fig. 5 tends to move said strip or bar 228 outward toward the supporting post or standard 57 projecting upward from the frame of the machine. Thus when said plunger-like members are moved outward or toward the post 57, the narrowing pickers 78 and 79 will be brought into action.

For the purpose of rendering said pickers inactive, I have herein shown as secured to the bracket 57 a bracket 237 upon which is pivoted at 238 a suitable bell-crank lever, one arm 239 of which engages the outer side of the bar 228. The said bell-crank lever is provided with a second arm 240 which, as clearly shown in Figs. 1 and 5, is suitably connected to an upright rod 241 to the lower end whereof is suitably connected a lever 242 extending into operative relation to the cam or pattern drum 60 (see Fig. 1), so as to be controlled by suitable cams 243 thereon. By such means it will be evident that the pickers 78 and 79 may be controlled to perform the various functions required thereof.

Upon withdrawal of the secondary cam block and the knitting cams 111, the pickers 205, 206 will also be withdrawn so as not to in any way interfere with the operation of the jack butts 34' or of any other of the needles employed in forming the strips 11 and 12 of said blank. It also is desirable at this time to withdraw from action the pickers 209, 210 so that they will not interfere with the knitting of the circular courses of said blank, and this is effected by the instrumentalities hereinbefore described in connection with said pickers.

To form a blank such as I have disclosed in Fig. 14 by reciprocating knitting, and where a seam is to be formed upon one side only of the stocking, the needles are preferably rearranged in the cylinder so that the groups 36 and 37 thereof may be positioned properly with respect to the other needles to fashion the calf portion of the strip, as shown at 20 Fig. 14. In Figs. 8 and 10 I have shown such an arrangement of the needles wherein the needles 34 are arranged as in the previous case, but the needles 36 and 37 have been grouped together adjacent to one end of the series 34 and the group 35 placed upon the opposite side of said group 34.

To form the mate to the blank produced by the arrangement shown in Fig. 8, the needles 36 and 37 will be shifted to the opposite side of the series 34, as shown in Fig. 8ª. As the blank of Fig. 14 contains but a single strip, the knitting thereof may be and is herein effected entirely by reciprocating knitting, and as the needle cylinder is moved approximately a complete rotation thereof, it is desirable that sufficient needles be removed from the cylinder to produce a gap at least equal to the space occupied by the knitting cams so that all of the needles thereof may be brought into co-action with the knitting cams of the primary set 38, only once in each reciprocation. To form this blank, the secondary cams 111 are not required, and may be withdrawn as hereinbefore stated, together with the narrowing and widening pickers associated therewith.

In connection with this blank, however, it is desirable to form selvaged edges along both sides thereof, and the instrumentalities hereinbefore referred to for positioning the pickers 82 and 83 are employed and the various cams such, for instance, as the cams 62 and 66 are brought into action to perform their particular functions. The toe and heel pockets of said blank are produced in the manner hereinbefore described in connection with the other blanks.

In producing the blank of Fig. 15 wherein the seam is to be at the back of the leg and along the bottom of the sole of the foot, a different arrangement of the needles of the cylinder is required, as I have indicated in Figs. 8ᵇ and 11. In this arrangement, the entire number of needles employed is less than the full complement as in the previous instance and these are divided into similar groups, with the groups 36 and 37 separated from the group 34 by sections of the group 35, which group is divided substantially in halves, as shown.

The toe pocket of this type of blank may be and preferably is formed differently from those hereinbefore described in that it is knitted integral with the instep section of the foot rather than with the sole portion thereof, and in producing this type of toe the narrowing and widening will be effected upon the instep needles 34, co-acting with the secondary cams 111, while at this time the primary cams will be withdrawn, together with the picking instrumentalities associated therewith, and to effect such a change I have, as most clearly shown in Figs. 1, 4 and 5, provided a lever 244 pivoted at 245 upon the post or standard 57. One arm of said lever 244 is connected with a link 246 in turn pivoted at 247 upon the cam block 39. The other arm of said lever is pivotally connected with a rod 248 extending downwardly through the base 94 and into engagement with a cam lever 249 pivoted upon the stud 250 carrying the usual yarn-guide operating levers, as shown in said Hemphill patent. The lever 249 is arranged to engage the periphery of the pattern drum 60 upon which is a cam 251 suitably arranged to withdraw said cam block at the proper time in the operation of the machine. A spring 252 is interposed between the rear of the cam block 39 and an abutment 253 secured to the cam plate 40, see Fig. 4, so that upon the releasing of said block by the cam 251 said cam block 39 will be moved by said spring into its operative position.

Having adjusted the machine so as to form the blank of Fig. 15, as hereinbefore described, knitting may be started to form the toe pocket, the narrowing and widening pickers associated with said secondary knitting cam operating in the usual well known manner to produce said toe pocket.

Following the formation of the toe pocket, all of the needles except those of the groups 36 and 37 are brought into action and knitting may proceed to knit by reciprocating knitting the foot and instep portions thereof, producing a gap in the sole of the foot by reason of the withdrawal needles 36 and 37, the edges whereof may be selvaged.

The formation of said blank may be produced by means of the secondary cams, but herein I preferably produce the same upon the primary knitting cams 38, therefore upon the completion of the toe pocket I withdraw the secondary cams 111 and the pickers associated therewith and move into operation by the means hereinbefore described the primary cams 38, the narrowing pickers 78 and 79 of said primary cams as are also the widening pickers 82 and 83 being utilized to form said selvages as above stated. When the point in the knitting is reached where the heel pocket is to be produced, said pickers are adjusted to their operating positions and operated in the usual manner to narrow and widen for said heel pocket, forming said pocket in two sections. Upon the completion of said pocket, knitting proceeds to the base of the calf where fashioning is to take place, and this I accomplish in the present case by means of the pickers 149 and 150 operated as hereinbefore described to pick into action certain of the needles of the groups 36 and 37. When the point 24 at the top of the calf is reached, knitting proceeds upon the full complement of needles to form the balance 25 of the blank.

While I have herein shown and described merely for illustrative purposes one specific embodiment of my invention, together with certain examples of work that may be produced thereon, and have disclosed and discussed in detail the construction and arrangement incidental to such disclosures, it is to be distinctly understood that the invention is limited neither to the mere details or relative arrangement of parts, nor to the specific applications herein shown, but that extensive deviations from the illustrations may be made without departing from the principle thereof.

Claims:

1. A stocking knitting machine having means to knit upon two separate sets of needles two sections of fabric constituting, respectively, the front and back of the foot and leg portions of the stocking, means to form reinforcing loop formations of and by the main threads thereof upon the terminal needles of the said two sections of fabric, thereby reinforcing the selvage portions of each of said two sections by the main thread thereof, and means to fashion one of said sections.

2. A stocking knitting machine having means to knit simultaneously two sections of fabric constituting, respectively, the front and back of the foot and leg portions of the stocking, means to form reinforcing loop formations of and by the main threads thereof upon the terminal needles of the said two sections of fabric, thereby reinforcing the selvage portions of each of said two sections by the main thread thereof, and means to fashion one of said sections.

3. A stocking knitting machine having means to knit two sections of fabric constituting, respectively, the front and back of the foot and leg portions of the stocking, means to form reinforcing loop formations of and by the main threads thereof upon the terminal needles of the said two sections of fabric, thereby reinforcing the selvage portions of each of said two sections by the main thread thereof, means to fashion one of said sections, and means to unite said sections in a seamless, tubular section of fabric.

4. A stocking knitting machine having a circular series of needles, two sets of knitting cams, means to effect relative movement between said needles and said cams to knit two sections of fabric constituting, respectively, the front and back of the foot and lower leg portions of a stocking, means to form reinforcing loop formations of and by the main threads thereof upon the terminal needles of the said two sections of fabric, thereby reinforcing the selvage portions of each of said two sections by the main thread thereof, means to fashion the leg portion of one of said sections, and means to effect the knitting by one of said sets of knitting cams of a tubular section of fabric integral with said two sections.

5. A stocking knitting machine having a circular series of needles, two sets of knitting cams, means to effect relative movement between said needles and said cams to knit two sections of fabric constituting, respectively, the front and back of the foot and lower leg portions of a stocking, means to form reinforcing loop formations of and by the main threads thereof upon the terminal needles of the said two sections of fabric, thereby reinforcing the selvage portions of each of said two sections by the main thread thereof, means to fashion opposite edges of the leg portion of one of said sections, and means to effect the knitting of a tubular section of fabric integral with said sections.

6. A stocking knitting machine having means to knit upon separate sets of needles two reinforcing selvaged strips of fabric constituting, respectively, the front and back of the foot and leg portions of the stocking, means to form reinforcing loop formations of and by the main threads thereof upon the terminal needles of the said two sections of fabric, thereby reinforcing the selvage portions of each of said two sections by the main thread thereof, and means to fashion one of said strips.

7. A stocking knitting machine having means to knit upon separate sets of needles two sections of fabric constituting, respectively, the front and back of the foot and leg portions of the stocking, means to form by manipulating the main threads alone, reinforcing selvages upon said two sections of fabric, means to effect the formation of toe and heel pockets in one of said sections, and means to fashion the calf portion of the last-mentioned section.

8. A stocking knitting machine having a circular series of needles, two sets of knitting cams, means to effect relative, reciprocating movement between said needles and said cams to simultaneously knit two strips of fabric constituting, respectively, the front and back of the foot and leg of the stocking, means to form reinforcing loop formations of and by the main threads thereof upon the terminal needles of the said two sections of fabric, thereby reinforcing the selvage portions of each of said two sections by the main thread thereof, means to effect the widening of the calf portion of said back strip, and means to effect a relative, rotary movement between said needles and said cams to knit integral with said strips a tubular section of fabric constituting the upper leg of the stocking.

9. A stocking knitting machine having a circular series of needles, two sets of knitting cams, means to effect co-action between each of said cams and different groups of said needles to knit two selvaged strips constituting, respectively, the front and back foot and lower leg sections of a stocking, means to form by manipulation of the main threads thereof, reinforcing selvages upon said two sections of fabric, and picker means for widening the calf portion of one of said strips.

10. A stocking knitting machine having a circular series of needles, a set of knitting cams, means to effect co-action between all of said needles and said cams to knit tubular fabric, means to withdraw a plurality of groups of said needles, means to effect the casting off of the loops on said withdrawn needles, means to effect the knitting upon the remaining needles of two sections of fabric terminating in selvages having a loop and a partial loop in each of a series of courses in the same wale, thereby reinforcing the fabric, and means to gradually restore said withdrawn needles to form a fashioned calf.

11. A stocking knitting machine having a circular series of needles, a set of knitting cams, means to effect co-action between all of said needles and said cams to knit tubular fabric, means to withdraw a plurality of groups of said needles, means to effect the knitting upon the remaining needles of two separated sections of fabric terminating in selvages having a loop and a partial loop in each of a series of courses in the same wale, thereby reinforcing the fabric, means to form toe and heel pockets in one of said sections, and means to gradually restore said withdrawn needles to form a fashioned area upon one of said sections.

12. A stocking knitting machine having a circular series of needles, two sets of knitting cams, means to effect co-action between one of said sets of cams and all of said needles to knit tubular fabric, means for withdrawing a plurality of groups of said needles, means to effect the formation upon the remaining needles of a toe pocket, means to effect co-action between each of said sets of cams and a separate group of said needles to simultaneously knit strips of fabric constituting the sole and instep portions of a stocking, means to withdraw said instep needles, means to knit a heel pocket in connection with said sole strip, means to effect co-action between said instep and sole needles and their respective cams to form front and back leg strips, means to form reinforcing loop formations of and by the main threads thereof upon the terminal needles of the said two sections of fabric, thereby reinforcing the selvage portions of each of said two sections by the main thread thereof, and means for gradually restoring the remaining needles of said circular series during the formation of said strips to fashion the calf portion of the stocking.

13. A stocking knitting machine having a circular series of needles, two sets of knitting cams, means to effect co-action between one of said sets of cams and all of said needles to knit tubular fabric, means for withdrawing a plurality of groups of said needles, means to effect the formation upon the remaining needles of a toe pocket, means to effect co-action between each of said sets of cams and a separate group of said needles to simultaneously knit strips of fabric constituting the sole and instep portions of a stocking, means to withdraw said instep needles, means to knit a heel pocket in connection with said sole strip, means to effect co-action between said instep and sole needles and their respective cams to form front and back leg strips, means to form reinforcing loop formations of and by the main threads thereof upon the terminal needles of the said two sections of fabric, thereby reinforcing the selvage portions of each of said two sections by the main thread thereof, means for gradually restoring the remaining needles of said circular series during the formation of said strips to fashion the calf portion of the stocking, and means to effect co-action between one of said sets of knitting cams and all of the needles of said series to knit a tubular section of fabric uniting said strips.

14. A stocking knitting machine having a circular series of needles, means to knit upon two groups 34 and 35 of said needles, strips of fabric constituting the front and back sections of a stocking, means to form reinforcing loop formations of and by the main threads thereof upon the terminal needles of the said two sections of fabric, thereby reinforcing the selvage portions of each of said two sections by the main thread thereof, and picker means adapted to gradually add to the needles of the group 35 to form a fashioned calf.

15. A stocking knitting machine having a circular series of needles, two sets of knitting cams, means to effect relative, reciprocating movement between each of said sets of knitting cams and a different group of said needles to knit strips of fabric constituting front and back portions of a stocking, and means to form on said strips selvaged edges consisting of a continuous series of inter-engaged loops approximating twice the length of the loops constituting said strips.

16. A stocking knitting machine having a circular series of needles, two sets of knitting cams, means to effect relative, reciprocating movement between each of said sets of knitting cams and a different group of said needles to knit strips of fabric constituting front and back portions of the foot and leg of a stocking, and picker means adapted to form at the edges of said strips continuous series of inter-engaged double loops approximating twice the length of the loops constituting said strips.

17. A stocking knitting machine having a circular series of needles, two sets of knitting cams, means to effect relative, reciprocating movement between each of said sets of knitting cams and a different group of said needles to knit strips of fabric constituting front and back portions of the foot and leg of a stocking, picker means, and means to actuate said pickers in non-fashioned work to effect the formation of selvages along the edges of said strips.

18. In a stocking knitting machine having means to knit upon two separate sets of needles two sections of fabric constituting, respectively, the front and back of the foot and leg portion of the stocking, and means to form, selvages along the edges of said strip, including narrowing and widening pickers active for said purpose regardless of the fashioned or non-fashioned character of its edges.

19. In a stocking knitting machine having means to knit upon two separate sets of needles two sections of fabric constituting, respectively, the front and back of the foot and leg portion of the stocking, and means to form selvages along the edges of said strip, including two sets of narrowing and widening pickers active for said purpose regardless of the fashioned or non-fashioned character of its edges.

20. In a stocking knitting machine having means to knit upon two separate sets of needles two sections of fabric constituting, respectively, the front and back of the foot and leg portion of the stocking, means to form in one of said strips toe and heel pockets, said means including narrowing and widening pickers, and means including said narrowing and widening pickers to form selvages along the edges of said strip, said pickers being active for the purpose of selvaged formation during non-fashioned work.

21. A stocking knitting machine having a series of knitting needles, primary and secondary sets of knitting cams, means to effect co-action between said primary and secondary cam sets and predetermined groups of said needles to knit two strips of fabric, and picker means cooperating with each of said cam sets to form selvages along the edges of said strips, said pickers being active for the purpose of selvaged formation during non-fashioned work.

22. A stocking knitting machine having a circular series of needles, primary and secondary sets of knitting cams, means for relatively reciprocating said needles and said cam sets, means including upper knitting butts adapted to effect co-action between said primary set of cams and a group of said needles to knit a selvaged strip, means to form reinforcing loop formations of and by the main threads thereof upon the terminal needles of the said two sections of fabric, thereby reinforcing the selvage portions of each of said two sections by the main thread thereof, means including lower jack butts adapted to effect co-action between said secondary set of cams and a group of said needles to knit a reinforcing selvaged strip, a needle-withdrawing cam, means including lower jack butts to co-act with said withdrawing cam to withdraw from action a third group of needles, and picker means for restoring said latter group to action for fashioning one of said strips of fabric.

23. A stocking knitting machine having a circular series of needles, primary and secondary knitting cams, narrowing and widening pickers associated with each of said knitting cams, said widening pickers each having a double butt-receiving recess and a single butt-receiving recess, means to move said narrowing and widening pickers into and out of operation, and means to effect co-action between predetermined recesses of said widening pickers and the knitting butts of said needles.

24. A stocking knitting machine having a circular series of needles, primary and secondary knitting cams, means to effect co-action between said needles and one of said cams to knit tubular work, means to withdraw the other knitting cams, means to effect co-action between each of said sets of knitting cams and predetermined groups of said needles to knit strips of fabric integral with said tubular work, means to form reinforcing loop formations of and by the main threads thereof upon the terminal needles of the said two sections of fabric, thereby reinforcing the selvage portions of each of said two sections by the main thread thereof, means to withdraw groups of needles between those groups actuated by said knitting cams to produce gaps therebetween, means to operate said withdrawn needles to effect the casting off of the loops, and picker means for restoring said groups of needles to action whereon to effect the widening of one of said strips of fabric.

25. A stocking knitting machine having a series of needles, knitting cams, means to effect a relative reciprocating movement between said knitting cams and said needles, to knit two strips of fabric each selvaged at opposite edges, means to form reinforcing loop formations of and by the main threads thereof upon the terminal needles of the said two sections of fabric, thereby reinforcing the selvage portions of each of said two sections by the main thread thereof, means to form toe and heel pockets in one of said strips, including narrowing and widening pickers, and picker means constructed and arranged to gradually restore needles at one side of and to fashion one of said strips.

26. A stocking knitting machine having a circular series of needles including instep, sole and fashioning needles, two sets of knitting cams, means to effect relative rotary and reciprocatory movements between said needles and said cams, means to effect co-action between said instep and said sole needles and separate sets of said cams to knit reciprocatively reinforcing selvaged strips constituting instep and sole and front and back leg portions of a stocking, and reinforced at the selvage loops thereof by the formation of a loop and a partial loop in each of a series of courses, means including narrowing and widening pickers to form upon said sole needles toe and heel pockets, picker means to gradually add said fashioning needles to said sole needles to form a fashioned leg, and means to effect rotary knitting upon all of said needles to form a tubular leg integral with said strips.

27. A stocking knitting machine having primary and secondary knitting cam sets, a series of needles provided with knitting butts to co-act with said primary cams, said series including instep, sole and fashioning needles, a second series of knitting butts for said instep needles adapted to cooperate with secondary cams, means to effect co-action between said second set of knitting butts only, and said secondary cams, cooperating picker means to effect during non-fashioned work the formation of reinforcing selvages upon the fabric strips knitted by said primary cams and secondary cams respectively, a second set of butts for said fashioning needles, means co-acting with said latter butts to withdraw said fashioning needles from co-action with said primary cams, and picker means for cooperating with said latter butts to restore said fashioning needles to action with respect to said primary knitting cams.

28. A stocking knitting machine having primary and secondary knitting cam sets, a circular series of needles provided with knitting butts to co-act with said primary cams to form a knitted web of maximum size, said series including instep, sole and fashioning needles, a second series of knitting butts for said instep needles adapted to co-act only with said secondary cams to knit the instep portion of a stocking, means to form upon strips knitted respectively upon said primary cams and said secondary cams, reinforcing selvages by terminal loop and partial loop formations in the same wale in each of the series of courses having said selvages, pickers to co-operate with certain groups of said needles to form a toe and heel pocket, means to withdraw said fashioning needles, and picker means to restore said fashioning needles to fashion the leg of the stocking.

29. In a stocking knitting machine having a circular series of needles, knitting cams, means to relatively reciprocate said needles and said cams at least through a part of its operations, means to effect co-action between a portion of said needles and said cams to knit a strip of fabric, narrowing and widening pickers, said widening pickers each having two butt-receiving notches, and means to position one of said notches to cooperate with said narrowing pickers to narrow and widen, said means being also adapted to position the other of said notches to cooperate with said narrowing picker to form a selvage on said strip.

30. A stocking knitting machine having two sets of knitting cams having independent needles and having means to knit upon two separate sets of said needles two sections of fabric constituting respectively the front and back of the foot and leg portions of the stocking, means for effecting co-action between each of said sets of cams and a selected group of said needles to form means to form reinforcing loop formations of and by the main threads thereof upon the terminal needles of the said two sections of fabric, thereby reinforcing the selvage portions of each of said two sections by the main thread thereof, and means to widen one of said strips.

31. A stocking knitting machine having two sets of knitting cams having independent needles and having means to knit upon two separate sets of said needles two sections of fabric constituting respectively the front and back of the foot and leg portions of the stocking, group-selecting means for effecting simultaneous co-action between each of said cams and a group of said needles to knit strips of fabric, means to form reinforcing loop formations of and by the main threads thereof upon the terminal needles of the said two sections of fabric, thereby reinforcing the selvage portions of each of said two sections by the main thread thereof, and means to widen one of said strips.

32. A stocking knitting machine having two sets of knitting cams having independent needles and having means to knit upon two separate sets of needles two sections of fabric constituting respectively, the front and back of the foot and leg portions of the stocking, means to form reinforcing loop formations of and by the main threads thereof upon the terminal needles of the said two sections of fabric, thereby reinforcing the selvage portions of each of said two sections by the main thread thereof, and means to fashion one of said strips.

33. A stocking knitting machine having two sets of knitting cams having independent needles and having means to knit upon two separate sets of said needles two sections of fabric constituting respectively the front and back of the foot and leg portions of the stocking, means to form reinforcing loop formations of and by the main threads thereof upon the terminal needles of the said two sections of fabric, thereby reinforcing the selvage portions of each of said two sections by the main thread thereof, means to fashion one of said strips, and means to effect the knitting of a tubular web integral with and uniting said strips 34. A circular stocking knitting machine having a circular series of needles upon which are adapted to be knitted two sections of fabric constituting respectively the front and back of the foot and leg portions of the stocking, two sets of knitting cams, means to effect simultaneous co-action between each of said cams and selected groups of said needles to knit two strips, means to form reinforcing loop formations of and by the main threads thereof upon the terminal needles of the said two sections of fabric, thereby reinforcing the selvage portions of each of said two sections by the main thread thereof, means to widen one of said strips, and means to effect co-action between only one of said cam sets and all of said needles to form a tubular web integral with and uniting said strips.

35. A circular stocking knitting machine having a circular series of needles upon which are adapted to be knitted two sections of fabric constituting respectively the front and back of the foot and leg portions of the stocking, means to simultaneously knit upon two groups 34 and 35 of said needles strips of fabric, means to form reinforcing loop formations of and by the main threads thereof upon the terminal needles of the said two sections of fabric, thereby reinforcing the selvage portions of each of said two sections by the main thread thereof, and pickers 149, 150 adapted, respectively, to add a plurality of needles at opposite sides of the group 35 to effect the widening of the strip of fabric formed thereon.

36. A stocking knitting machine having a series of independent needles whereon are adapted to be knitted two sections of fabric constituting respectively the front and back of the foot and leg portions of the stocking, two sets of knitting cams whereon respectively to knit said two sections of fabric, means relatively to rotate and reciprocate said needles and said cams, means to effect simultaneous co-action between each of said cam sets and predetermined groups of said needles to form a plurality of of strips of fabric, and picker means to cooperate with the end needles of said groups to form selvages along each edge of said strips during non-fashioned work.

37. A stocking knitting machine having a series of independent needles whereon are adapted to be knitted two sections of fabric constituting respectively the front and back of the foot and leg portions of the stocking, two sets of knitting cams whereon respectively to knit said two sections of fabric, means relatively to rotate and reciprocate said needles and said cams, means to effect simultaneous co-action between each of said cam sets and predetermined groups of said needles to form a plurality of strips of fabric, picker means to cooperate with the end needles of said groups to form selvages along each edge of said strips during non-fashioned work, and means to effect co-action between one of said sets of cams and all of said needles to form a tubular web integral with and uniting said strips.

38. In a stocking knitting machine having means to knit upon two separate sets of needles two sections of fabric constituting, respectively, the front and back of the foot and leg portion of the stocking, and means to form reinforcing selvages along the edges of said strip, including narrowing and widening pickers active during non-fashioned work in effecting such formation.

39. A stocking knitting machine having a circular series of needles, two sets of knitting cams, means to effect relative, reciprocating movement between each of said sets of knitting cams and a different group of said needles to knit strips of fabric constituting front and back portions of the foot and leg of a stocking, picker means, and means to actuate said pickers to effect the formation of reinforcing selvages in non-fashioned work along the edges of said strips.

40. In a stocking knitting machine having means to knit upon two separate sets of needles two sections of fabric constituting, respectively, the front and back of the foot and leg portion of the stocking, and means to form reinforcing selvages along the edges of said strips, including two sets of narrowing and widening pickers active during non-fashioned work in effecting such formation.

41. In a stocking knitting machine having means to knit upon two separate sets of needles two sections of fabric constituting, respectively, the front and back of the foot and leg portion of the stocking, means to form in one of said strips toe and heel pockets, said means including narrowing and widening pickers, and means including said narrowing and widening pickers to form reinforcing selvages along the edges of said last mentioned strip active during non-fashioned work in effecting such formation.

42. A stocking knitting machine having a series of knitting needles, primary and secondary sets of knitting cams, means to effect co-action between said primary and secondary cam sets and predetermined groups of said needles to knit two strips of fabric, and picker means cooperating with each of said cam sets to form reinforcing selvages along the edges of said strips active during non-fashioned work in effecting such formation.

43. A rotary stocking knitting machine having means to knit upon two separate sets of needles, two sections of fabric, constituting respectively the front and the back of the foot and leg portions of the stocking with picker means to form reinforcing selvages upon both of said sections during non-fashioned work.

44. A rotary stocking knitting machine having means to knit upon two separate sets of needles, two sections of fabric, constituting respectively the front and the back of the foot and leg portions of the stocking with picker means to form reinforcing selvages upon both of said sections during non-fashioned work, and means to knit a tubular portion as a unitary continuation of said two sections.

45. A circular stocking knitting machine having a primary set of knitting cams and a secondary set of knitting cams, a circular series of needles including a series of needles 34 and a series of needles 35, means relatively to reciprocate the needles and said cams, and means to elevate the needles 34 to the idle level above the primary cams but causing said series to be acted upon by the secondary cams to knit a selvaged strip, said series of needles 35 being acted on only by the primary knitting cams, to form a second selvaged strip, together with means to form reinforcing selvages upon both of said strips by manipulation of the main threads thereof respectively.

46. A circular stocking knitting machine having a circular set of needles, primary knitting cams, secondary knitting cams, means whereby each set of cams acts only upon its own series of needles, picker means cooperating with one series of needles to cause narrowing and widening, and means cooperating with said picker means to form reinforcing selvages upon one of said strips during non-fashioned work.

47. A circular stocking knitting machine having a circular set of needles, primary knitting cams, secondary knitting cams, means whereby each set of cams acts only upon its own series of needles, picker means cooperating with one series of needles to cause narrowing and widening, and means cooperating with said picker means to form reinforcing selvages upon one of said strips, together with other picker means to form reinforcing selvages upon the other of said strips during non-fashioned work.

48. A circular stocking knitting machine comprising, in combination, a primary set of knitting cams, a secondary set of knitting cams, a circular series of needles including two series each acted upon by one of said sets of knitting cams only, so as to form two knitted strips, narrowing and widening picker means for forming heel and toe pockets upon one of said strips, co-acting means whereby said picker means during non-fashioned work form reinforcing selvages upon the strip having heel and toe pockets, and other picker means for forming reinforcing selvages upon the other strip during non-fashioned work.

49. In a stocking knitting machine, a series of knitting needles, means to knit upon a portion of said needles to form a strip of fabric constituting at least a part of a stocking, means including narrowing and widening pickers to form in said strip, heel and toe pockets, said widening pickers having recesses to receive two needles during the knitting of said pockets, said widening pickers also having recesses to receive single needles and to act upon said single needles upon the formation of reinforcing selvages for said strip.

50. In a stocking knitting machine, a series of knitting needles, means to knit upon a portion of said needles to form a strip of fabric constituting at least a part of a stocking, means including narrowing and widening pickers to form in said strip, heel and toe pockets, said widening pickers having recesses to receive two needles during the knitting of said pockets, said widening pickers also having recesses to receive single needles and to act upon said single needles upon the formation of reinforcing selvages for said strip and means to effect alignment of the proper recesses with butts of said needles.

51. In a stocking knitting machine, a series of knitting needles, means to knit upon a portion of said needles to form a strip of fabric constituting at least a part of a stocking, means including narrowing and widening pickers to form in said strip, heel and toe pockets, said widening pickers having recesses to receive two needles during the knitting of said pockets, said widening pickers also having recesses to receive single needles and to act upon said single needles upon the formation of reinforcing selvages for said strip and means automatically to effect alignment of the proper recesses with butts of said needles.

52. In a stocking knitting machine, a series of knitting needles, means to knit upon a portion of said needles to form a strip of fabric constituting at least a part of a stocking, means including narrowing and widening pickers to form in said strip, heel and toe pockets, said widening pickers having recesses to receive two needles during the knitting of said pockets, said widening pickers also having recesses to receive single needles and to act upon said single needles upon the formation of reinforcing selvages for said strip and means automatically to position said widening pickers in positions respectively to widen and to form reinforcing selvages at opposite edges of said strip.

53. In a stocking knitting machine, a circular series of knitting needles arranged in two series for the formation of two selvaged strips, and including fashioning needles provided with upper knitting butts and lower fashioning butts, a pair of fashioning pickers each arranged to be moved idly by the leading fashioning butts during movements of said needles in one direction and to be functioned by the leading fashioning butts during movements of said needles in an opposite direction to move said leading needles into operative position, means automatically to position said fashioning pickers in fashioning positions and means to reciprocate the machine in the formation of said fabric strips.

54. In a stocking knitting machine, a circular series of knitting needles arranged in two series for the formation of two selvaged strips, and including fashioning needles provided with upper knitting butts and lower fashioning butts, a pair of fashioning pickers each arranged to be moved idly by the leading fashioning butts during movements of said needles in one direction and to be functioned by the leading fashioning butts during movements of said needles in an opposite direction to move said leading needles into operative position, means automatically to render said fashioning pickers operative for one or more courses and means to reciprocate the machine in the formation of said fabric strips.

55. In a circular stocking knitting machine, a primary set of knitting cams and a secondary set of knitting cams, a circular series of needles including a group having primary knitting butts only, a group having primary knitting butts and secondary knitting butts and a group having primary knitting butts and fashioning knitting butts, narrowing and widening pickers to act upon the butts of the needles having only primary knitting butts to form heel and toe pockets and reinforced selvages, narrowing and widening pickers to act only upon said secondary knitting butts and a third pair of pickers to act only upon said fashioning butts.

56. In a circular stocking knitting machine, a primary set of knitting cams and a secondary set of knitting cams, a circular series of needles including a group having primary knitting butts only, a group having primary knitting butts and secondary knitting butts and a group having primary knitting butts and fashioning knitting butts, narrowing and widening pickers to act upon the butts of the needles having only primary knitting butts, narrowing and widening pickers to act only upon said secondary knitting butts to form heel and toe pockets and reinforced edges, and a third pair of pickers to act only upon said fashioning butts.

57. In a circular stocking knitting machine, a primary set of knitting cams and a secondary set of knitting cams, a circular series of needles including a group having primary knitting butts only, a group having primary knitting butts and secondary knitting butts and a group having primary knitting butts and fashioning knitting butts, narrowing and widening pickers to act upon the butts of the needles having only primary butts, narrowing and widening pickers to act only upon said secondary knitting butts, and instrumentalities to function one or the other sets of said narrowing and widening pickers to form heel and toe pockets and to form reinforced selvages.

In testimony whereof, I have signed my name to this specification.

JOHN LAWSON.

CERTIFICATE OF CORRECTION.

Patent No. 1,751,450.             Granted March 18, 1930, to

JOHN LAWSON.

It is hereby certified that error appears in the above numbered patent requiring correction as follows: In the grant, testimony clause, date of issue, for this twenty-eighth day of January, in the year of our Lord one thousand nine hundred and thirty, read for this eighteenth day of March, in the year of our Lord one thousand nine hundred and thirty; page 15, line 31, claim 30, after the word "form" first occurrence insert the words and comma "two strips of fabric,"; and that the said Letters Patent should be read with these corrections therein that the same may conform to the record of the case in the Patent Office.

Signed and sealed this 13th day of May, A. D. 1930.

(Seal)

M. J. Moore,
Acting Commissioner of Patents.

knitting butts, narrowing and widening pickers to act only upon said secondary knitting butts to form heel and toe pockets and reinforced edges, and a third pair of pickers to act only upon said fashioning butts.

57. In a circular stocking knitting machine, a primary set of knitting cams and a secondary set of knitting cams, a circular series of needles including a group having primary knitting butts only, a group having primary knitting butts and secondary knitting butts and a group having primary knitting butts and fashioning knitting butts, narrowing and widening pickers to act upon the butts of the needles having only primary butts, narrowing and widening pickers to act only upon said secondary knitting butts, and instrumentalities to function one or the other sets of said narrowing and widening pickers to form heel and toe pockets and to form reinforced selvages.

In testimony whereof, I have signed my name to this specification.

JOHN LAWSON.

CERTIFICATE OF CORRECTION.

Patent No. 1,751,450.　　　　　　　　　　　　Granted March 18, 1930, to

JOHN LAWSON.

It is hereby certified that error appears in the above numbered patent requiring correction as follows: In the grant, testimony clause, date of issue, for this twenty-eighth day of January, in the year of our Lord one thousand nine hundred and thirty, read for this eighteenth day of March, in the year of our Lord one thousand nine hundred and thirty; page 15, line 31, claim 30, after the word "form" first occurrence insert the words and comma "two strips of fabric,"; and that the said Letters Patent should be read with these corrections therein that the same may conform to the record of the case in the Patent Office.

Signed and sealed this 13th day of May, A. D. 1930.

(Seal)　　　　　　　　　　　　　　　　　　　　　M. J. Moore,
　　　　　　　　　　　　　　　　　　　　　Acting Commissioner of Patents.